(12) United States Patent
Aso et al.

(10) Patent No.: US 9,548,641 B2
(45) Date of Patent: Jan. 17, 2017

(54) LINEAR AND ROTARY ACTUATOR SYSTEM

(71) Applicant: THK CO., LTD., Tokyo (JP)

(72) Inventors: Toshiyuki Aso, Tokyo (JP); Shuhei Yamanaka, Tokyo (JP); Takayuki Kuze, Tokyo (JP)

(73) Assignee: THK CO., LTD., Tokyo (JP)

( * ) Notice: Subject to any disclaimer, the term of this patent is extended or adjusted under 35 U.S.C. 154(b) by 510 days.

(21) Appl. No.: 14/182,886

(22) Filed: Feb. 18, 2014

(65) Prior Publication Data
US 2014/0159551 A1 Jun. 12, 2014

Related U.S. Application Data

(62) Division of application No. 13/121,849, filed as application No. PCT/JP2009/066980 on Sep. 29, 2009, now Pat. No. 8,686,603.

(30) Foreign Application Priority Data

Sep. 30, 2008 (JP) ................................. 2008-255073

(51) Int. Cl.
*H02K 41/00* (2006.01)
*H02K 11/00* (2016.01)
(Continued)

(52) U.S. Cl.
CPC ........... *H02K 11/0015* (2013.01); *H02K 7/083* (2013.01); *H02K 11/21* (2016.01);
(Continued)

(58) Field of Classification Search
CPC .......... H02K 7/06; H02K 7/083; H02K 11/21; H02K 21/14; H02K 41/103
See application file for complete search history.

(56) References Cited

U.S. PATENT DOCUMENTS 2,860,266 A 11/1958 Schrader
4,607,180 A 8/1986 Stoody
(Continued)

FOREIGN PATENT DOCUMENTS

JP 5-47541 6/1983
JP 2-298451 12/1990
(Continued)

OTHER PUBLICATIONS

KR Office Action, dated Jan. 11, 2016; Application No. 10-2011-7009783.
(Continued)

*Primary Examiner* — Dang Le
(74) *Attorney, Agent, or Firm* — Young & Thompson

(57) ABSTRACT

A linear and rotary actuator system includes a shaft member moving linearly in an axial direction and rotating around an axis line, a hollow rotor surrounding the shaft member, a stator of a rotary motor having a space for holding the rotor and which rotates the rotor around the axis line, linear bearings, that rotates together with the rotor to transmit rotation of the rotor of the rotary motor to the shaft member and accepts linear movement of the shaft member, an angle measuring unit for measuring a rotation angle of the rotor, and a rotary motor driver for controlling the rotary motor in such a manner that the rotation angle of the rotor of the rotary motor measured by the angle measuring unit conforms to a command value. The rotation angle of the shaft member is controlled by controlling the rotation angle of the rotor of the rotary motor.

7 Claims, 21 Drawing Sheets

(51) Int. Cl.
  *H02K 7/08* (2006.01)
  *H02K 21/14* (2006.01)
  *H02K 41/03* (2006.01)
  *H02K 7/06* (2006.01)

(52) U.S. Cl.
  CPC ............. *H02K 21/14* (2013.01); *H02K 41/03* (2013.01); *H02K 7/06* (2013.01); *H02K 2201/18* (2013.01)

(56) References Cited

U.S. PATENT DOCUMENTS

| | | | |
|---|---|---|---|
| 5,391,953 | A * | 2/1995 | van de Veen ........... F16F 15/03 310/68 B |
| 6,433,447 | B1 | 8/2002 | Kitazawa et al. |
| 6,570,282 | B1 * | 5/2003 | Ito ...................... F16H 25/2204 310/75 R |
| 6,823,725 | B2 | 11/2004 | Lohberg |
| 7,090,477 | B2 | 8/2006 | Hsu et al. |
| 8,143,750 | B2 | 3/2012 | Aso et al. |
| 8,686,603 | B2 * | 4/2014 | Aso ........................ H02K 7/083 310/12.14 |
| 2001/0043016 | A1 | 11/2001 | Chun et al. |
| 2004/0071810 | A1 | 4/2004 | Hsu et al. |
| 2005/0218727 | A1 * | 10/2005 | Gandel .................... H02K 7/06 310/80 |
| 2009/0218894 | A1 | 9/2009 | Aso et al. |

FOREIGN PATENT DOCUMENTS

| | | |
|---|---|---|
| JP | 8-237931 | 9/1996 |
| JP | 09-253967 | 9/1997 |
| JP | 2000-78809 | 3/2000 |
| JP | 2001-165271 | 6/2001 |
| JP | 2001-333567 | 11/2001 |
| JP | 2003-524778 | 8/2003 |
| JP | 2003-254780 | 9/2003 |
| JP | 2004-130772 | 4/2004 |
| JP | 2006-208025 | 8/2006 |
| JP | 2006-311715 | 11/2006 |
| JP | 2007-143385 | 6/2007 |
| KR | 2008-0046688 | 5/2008 |

OTHER PUBLICATIONS

International Search Report—PCT/JP2009/066980—Dec. 15, 2009.
CN Office Action dated Oct. 29, 2012, with English Translation; Application No. 200980138793.0.
Japanese Official Action—2010-219968—Nov. 5, 2013.

* cited by examiner

Enlarged view of XVI part

FIG. 25
(A)
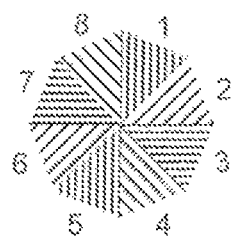
(B)
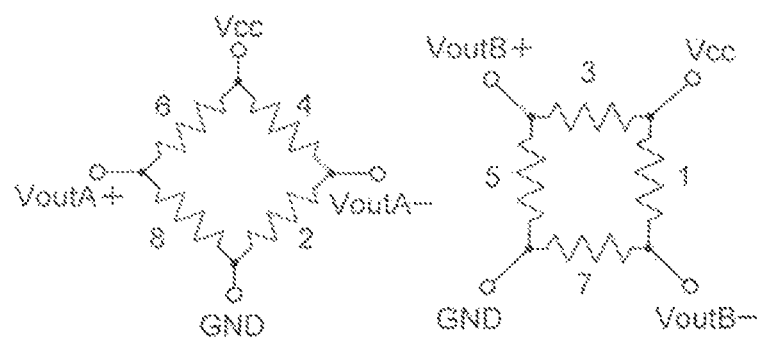
FIG. 26
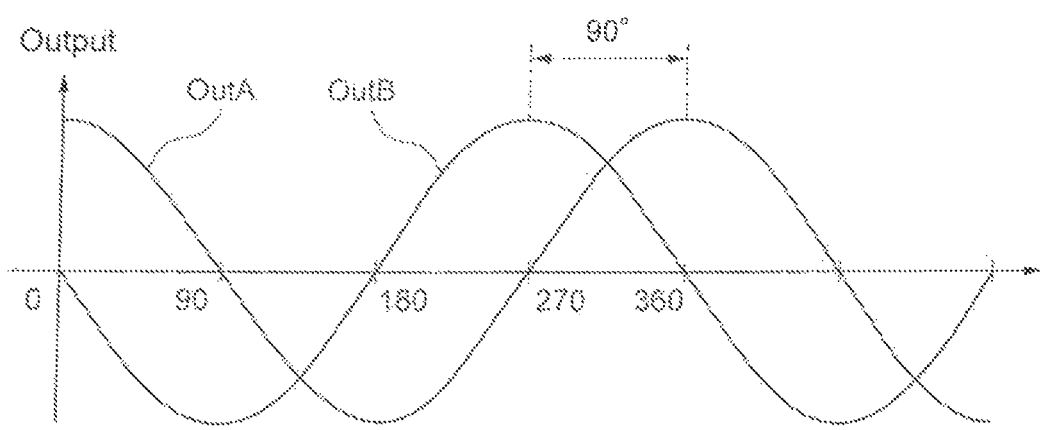

LINEAR AND ROTARY ACTUATOR SYSTEM

CROSS REFERENCE TO RELATED APPLICATIONS

This application is a division of application Ser. No. 13/121,849 filed on Mar. 30, 2011, which is a National Stage of PCT/2009/066980 filed on Sep. 29, 2009, which claims foreign priority to Japanese Application No. 2008-255073 filed on Sep. 30, 2008. The entire contents of each of the above applications are hereby incorporated by reference.

TECHNICAL FIELD

The present invention relates to a linear and rotary actuator system for making a movable body such as a machine tool move linearly in a Z-axis direction and rotate in the θ direction around the Z axis.

BACKGROUND ART

In an industrial robot, a linear and rotary actuator is sometimes embedded that makes the movable body move linearly in the Z-axis direction and rotate around the Z axis in the θ direction. For example, a head shaft of a chip mounter is required to make the movable body such as an absorption pad for absorption of an electronic component or machine tool move linearly in the Z-axis direction and rotate around the Z axis. Linear movement of the movable body in the Z-axis direction is needed in embodiment of the electronic component on a surface of a printed board and rotation of the movable body in the θ direction is needed in positioning of the rotation angle of the electronic component.

As a linear and rotary actuator capable of linear and rotary movement, the patent literature 1 discloses a linear and rotary pulse motor having a linear pulse motor and a rotary pulse motor connected to each other in the axial direction. In this linear and rotary pulse motor, a rotor of the rotary pulse motor is a hollow shaft and a spline bearing with a rotation stopper mechanism is arranged in this hollow shaft. The mover shaft of the linear pulse motor passes through the spline bearing slidably and linear pulse motor moves the mover shaft linearly in the Z-axis direction. An output of the rotary pulse motor in the rotary direction is transmitted to the mover shaft via the spline bearing. The mover shaft is rotated in the 0 direction by the rotary pulse motor.

As this linear and rotary pulse motor adopts a linear stepping motor having comb teeth of the mover face comb teeth of the stator, it is necessary to control an air gap between the mover and the stator to be a small fixed value.

In order to facilitate control of the air gap between the mover and the stator, the patent literature 2 discloses a linear and rotary pulse motor that adopts a linear synchronization motor instead of the linear pulse motor. This linear synchronization motor has a mover shaft having one or more permanent magnets magnetized in the axial direction and a stator having a plurality of coils stacked in the axial direction. An end of the linear synchronization motor in the axial direction is connected to the rotary motor. Torque of the rotary motor is transmitted to the mover shaft via the sliding bearing. In order to transmit rotation to the mover shaft, a guide hole of the sliding bearing is formed to have a rectangular cross section.

CITATION LIST

Patent Literature

PL1: Japanese Patent Application Laid-Open No. 8-237931
PL2: Japanese Patent Application Laid-Open No. 2006-311715

SUMMARY OF INVENTION

Technical Problem

Meanwhile, in the linear and rotary motor disclosed in the patent literatures 1 and 2, a rotary pulse motor is used to rotate a mover shaft. This rotary pulse motor rotates the mover shaft by a predetermined angle proportional to a given number of pulses under open loop control. However, due to the open loop control, the rotary pulse motor has problems of step-out, vibration and difficulty in high-speed rotation.

Then, the present invention has an object to provide a linear and rotary actuator that is capable of controlling a rotation angle of the mover shaft under closed loop control.

Solution to Problem

An aspect of the present invention is a linear and rotary actuator system, comprising: a shaft member configured to move linearly in an axial direction and rotate around an axis line; a hollow rotor surrounding the shaft member; a stator of a rotary motor in which a space for holding the rotor is formed and which rotates the rotor around the axis line; a linear bearing that rotates together with the rotor to transmit rotation of the rotor of the rotary motor to the shaft member and accepts linear movement of the shaft member; an angle measuring unit for measuring a rotation angle of the rotor; and a rotary motor driver for controlling the rotary motor in such a manner that the rotation angle of the rotor of the rotary motor measured by the angle measuring unit conforms to a command value, wherein the shaft member comprises a spline shaft having a rolling-element rolling part extending in an axial direction, the linear bearing comprises a spline nut having a rolling-element circulation passage including a loaded rolling-element rolling part facing the rolling-element rolling part of the spline shaft and a plurality of rolling elements arranged in the rolling-element circulation passage, each one of the two spline nuts is provided at both sides of a stator of the rotary motor, and the rotation angle of the shaft member is controlled by controlling the rotation angle of the rotor of the rotary motor.

Advantageous Effects of Invention

According to the present invention, as the angle measuring unit is provided for measuring a rotation angle of the hollow rotor and the rotation angle of the rotor of the rotary motor that does not move in the axial direction is controlled thereby to control the rotation angle of the shaft member that moves in the axial direction, control of the rotation angle of the shaft member can be facilitated. On the other hand, if the rotation angle of the shaft member is measured directly by the angle measuring unit, the shaft member not only rotates but also moves linearly in the axial direction, and therefore, there is a problem that an elongating angle measuring unit is required that covers a moving range in the axial direction of the shaft member.

BRIEF DESCRIPTION OF DRAWINGS

FIG. 25 is a view illustrating a magnetic sensor of two-full-bridge structure (FIG. 25(A) is a plan view illustrating the shape of ferromagnetic film metal of the magnetic sensor and FIG. 25(B) is a view of equivalent circuit);

FIG. 26 is a graph illustrating sine wave signals and cosine wave signals output from the magnetic sensor;

DESCRIPTION OF EMBODIMENTS

Figure 1:
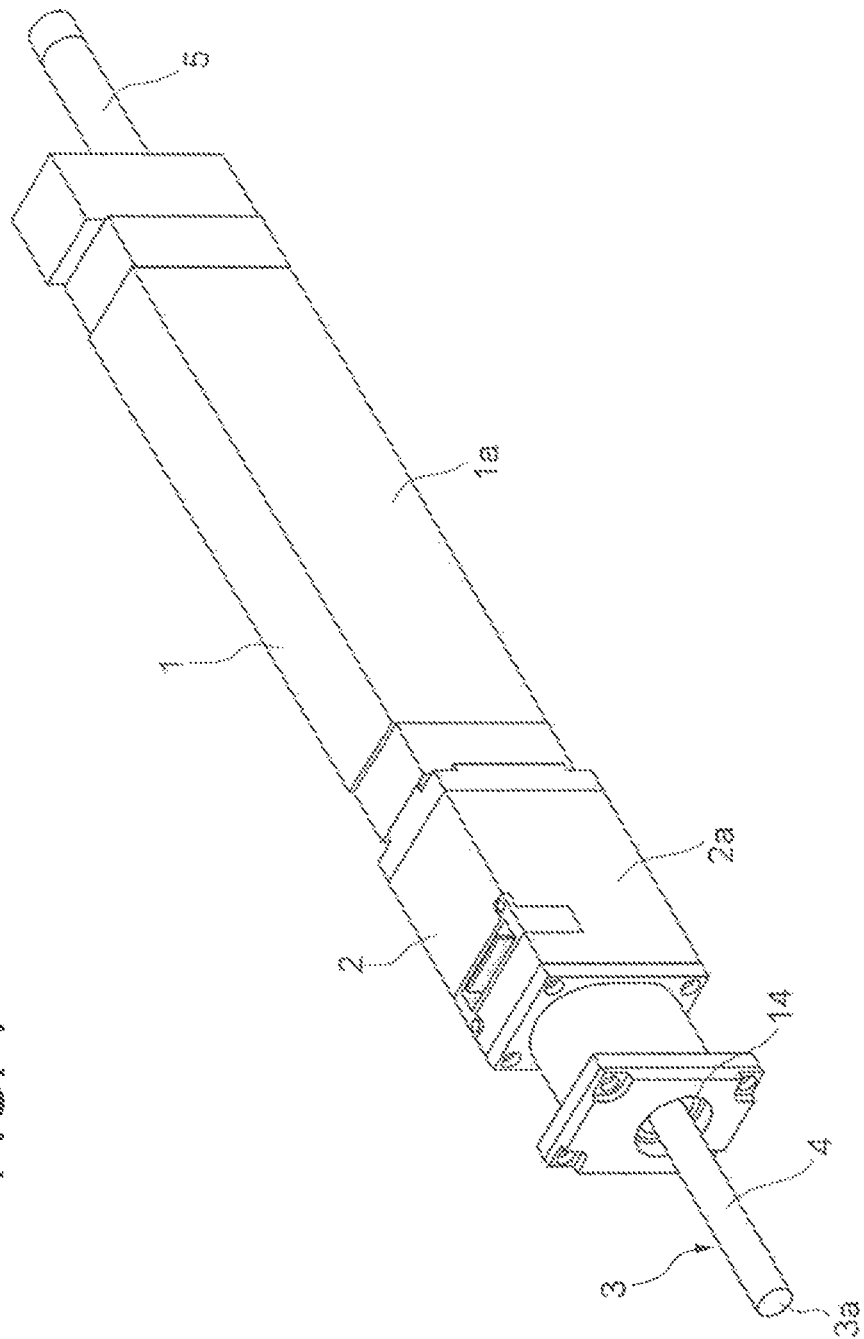
FIG. 1 is a perspective view of a linear and rotary actuator according to one embodiment of the present invention.

With reference to the attached drawings, a linear and rotary actuator according to a first embodiment of the present invention will be described in detail. FIG. 1 is a perspective view of the linear and rotary actuator. This linear and rotary actuator is a composite actuator capable of linear and rotary driving and has combination of a linear motor 1 and a rotary motor 2 connected to each other in the axial direction. In housings 1a, 2a of the linear and rotary actuator, a shaft member 3 is held rotatable around the axis and linearly movable in the axial direction. The shaft member 3 is combination of a rod 5 as a mover shaft of the linear motor 1 and a spline shaft 4 that are connected to each other in the axial direction. The linear motor 1 moves the shaft member 1 linearly and the rotary motor 2 rotates the shaft member 3. An end 3a of the shaft member 3 in the longitudinal direction is exposed from the housing. On this end 3a of the shaft member 3, a movable body such as an adsorption pad, tool or the like is mounted. The linear and rotary actuator may be a one-axis actuator or a multi-axis actuator for increasing the operation efficiency. In the multi-axis actuator, a plurality of linear and rotary actuators are combined with the respective shaft members 3 parallel to each other.

Figure 2:
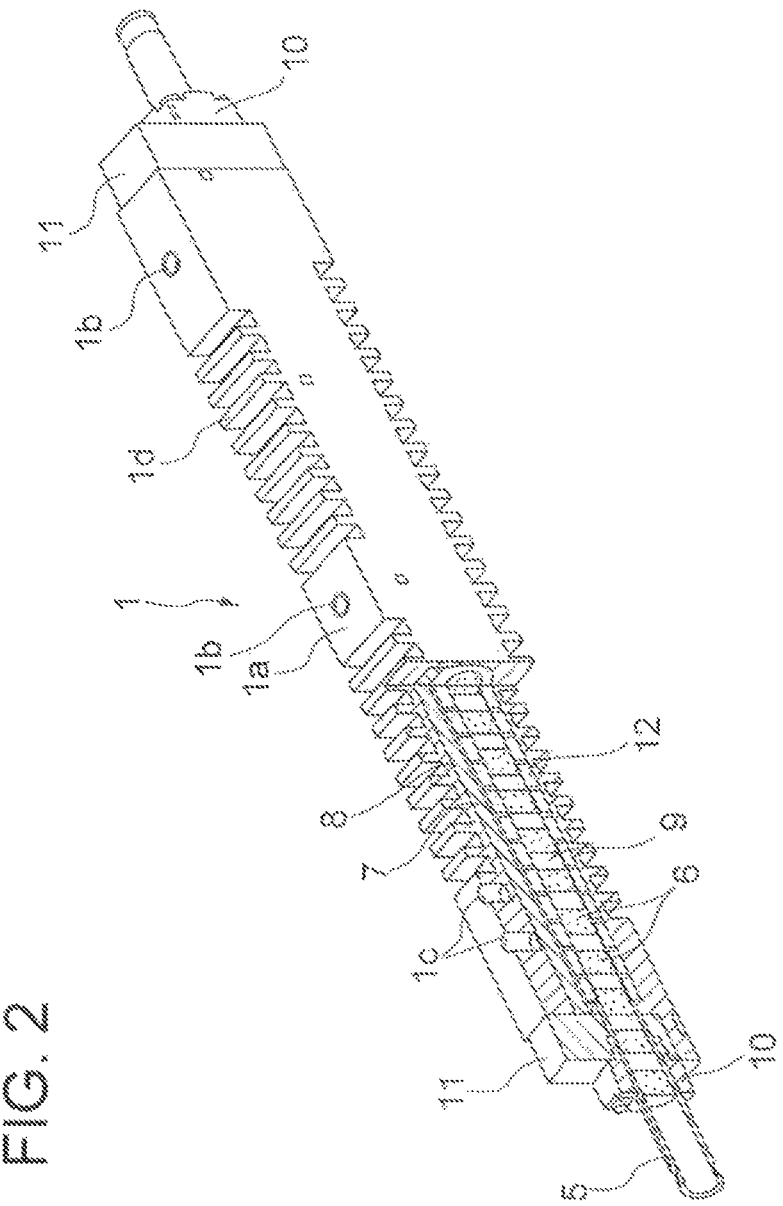
FIG. 2 is a perspective view of a linear motor (including a partial cross sectional view)

FIG. 2 is a perspective view of the linear motor 1 (including a partial cross sectional view). As illustrated in FIG. 2, the linear motor 1 is a linear synchronization motor 1 having a rod 5 as mover shaft, a plurality of coils 12 as stators stacked in the axial direction of the rod 5 and a housing 1 in which the coils 12 are accommodated. In the rod 5, a plurality of permanent magnets 6 is arranged with N pole and S pole formed alternately in the axial direction. Every three of the coils 12 comprises a three-phase coils 12 of U, V and W phases. The magnetic field generated on the permanent magnets 6 and the three-phase alternate current flowing in the three-phase coils 12 causes a thrust for linear movement of the rod 5.

The rod 5 of the linear motor 1 is held by the housing 1a to be movable in the axial direction of the rod 5. The coil unit is held by a coil holder 7. The coil unit and the coil holder 7 are accommodated in the housing 1a. The rod 5 is of a non-magnetic material such as a stainless steel and has a hollow space. In the hollow space of the rod 5, the disc-shaped permanent magnets 6 are stacked in such a manner that the same poles face each other, that is, n pole faces n pole and s pole daces s pole. Between the permanent magnets 6, a pole shoe 9 of magnetic material such as steel is arranged.

Figure 3:
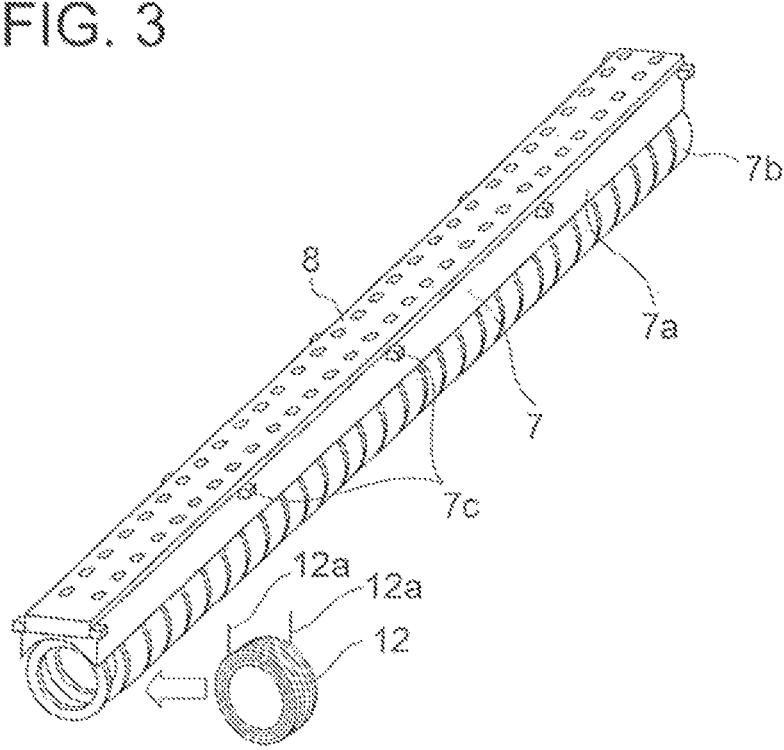
FIG. 3 is a perspective view illustrating a coil unit held by a coil holder.

Each coil 12 is a copper wire wound into a ring and held in the coil holder 7. FIG. 3 is a detail view of the coils 12 and coil holder 7 for holding the coils 12. The coil holder 7 is an injection mold of resin and has a plate-shaped holder main part 7a elongating in the arrangement direction of the coils 12 and a plurality of thin spacer parts 7b that suspends from the holder main part 7a. The spacer parts 7b of resin are placed between the coils 12 as insulating members in order to insulate the adjacent coils 12 from each other. Each spacer part 7b is formed into a disk like the front shape of the coils 12. On an upper surface of the holder main part 7a, a print board 8 is mounted. On each side of the holder main part 7a, a projection 7c (see FIG. 3) is provided to fix the coil holder 7 to a die in injection molding. This is for preventing shift of the coil holder 7 due to pressure in injection molding. In order to lead a lead wire 12a to a through hole of the print board 8 (in FIG. 3, the lead wire 12a of the coil 12 is soldered to the through hole), a plurality of wiring holes is formed in the holder main part 7a at the same positions of the through holes of the print board 8.

In this embodiment, the coils 12 and the coil holder 7 are set in a die for injection molding and molten resin or special ceramics is made to flow into the die in insert molding thereby to form the housing 1a. When the mold is taken out of the die, the coils 12 are surrounded by the housing 1a. As the housing 1a is formed by insert molding, the housing can be advantageously thinner. In the housing 1a, a screw hole 1b (see FIG. 2) is formed as a mounting part for mounting the linear motor 1 onto a head of a chip mounter, for example. Further, in the housing 1a, a positioning hole 1c is formed for inserting a pin for positioning the housing relative to the head thereinto. In order to keep insulation from the coils 12, the housing 1a is formed of resin of high insulation performance. In the housing 1a, fins 1d are formed for increasing heat dissipating performance.

During the operation of the linear motor 1, the rod 5 floats in the coils 12. In order to guide linear and rotary movement of the rod 5, a bush 10 of resin is provided as sliding bearing at each end of the housing 1a in the axial direction of the rod 5. A gap between the bush 10 and the rod 5 is smaller than the gap between the coils 12 and the rod 5. The bush 10 serves to prevent the coils 12 from coming into contact with the rod 5. The bush 10 is mounted on an end member 11 integrally formed at each end of the housing 1a. As the linear synchronization motor is used as the linear motor, the gap between the coils 12 and the rod 5 ca be controlled easily. Therefore, it is not necessary to combine the linear bearing with the rotary bearing and it becomes possible to guide the linear and rotary movement of the rod 5 by the bush 10. As the bushes 10 are provided in pair, even when the stroke is long, it becomes possible to eliminate bending of the rod 5 due to absorption of the permanent magnets 6. In this embodiment, the bushes 10 are provided at the respective ends of the housing 1a, but the bush 10 near the rotary motor 2 can be omitted as the spline nut 14 is arranged to the side nearer to the movable body.

Figure 4:
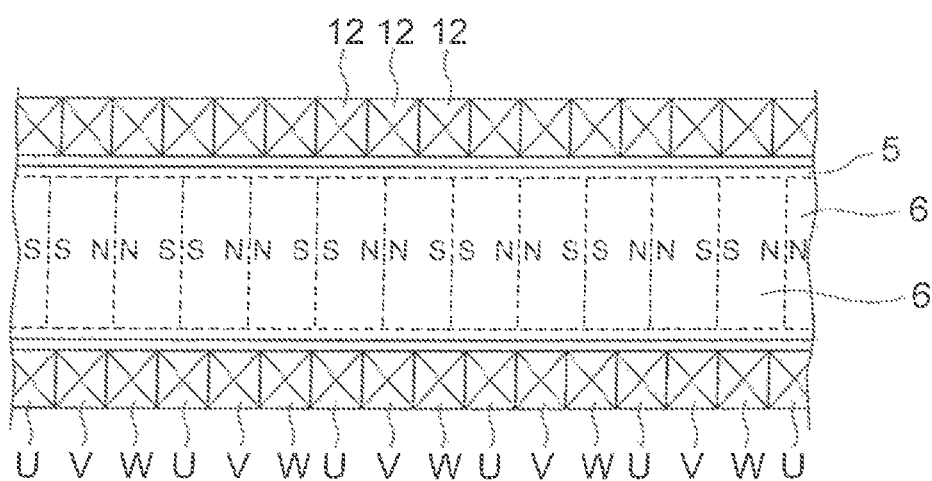
FIG. 4 is a view illustrating the operational principle of the linear motor.

FIG. 4 is a conceptual view of the operation principle of the linear motor 1. Around the rod 5, the plural coils 12 are stacked surrounding the rod 5. Every three coils 12 form one three-phase coil of U, V and W phases. A plurality of three-phase coils forms a coil unit. When the three-phase alternate current of 120-degree out of phase is made to pass through the three-phase coils 12, there occurs a moving magnetic field that moves in the axial direction of the coils 12. The rod 5 receives a thrust from the moving magnetic field to move linearly relative to the coils 12 at the same speed of the moving magnetic field.

Figure 5:
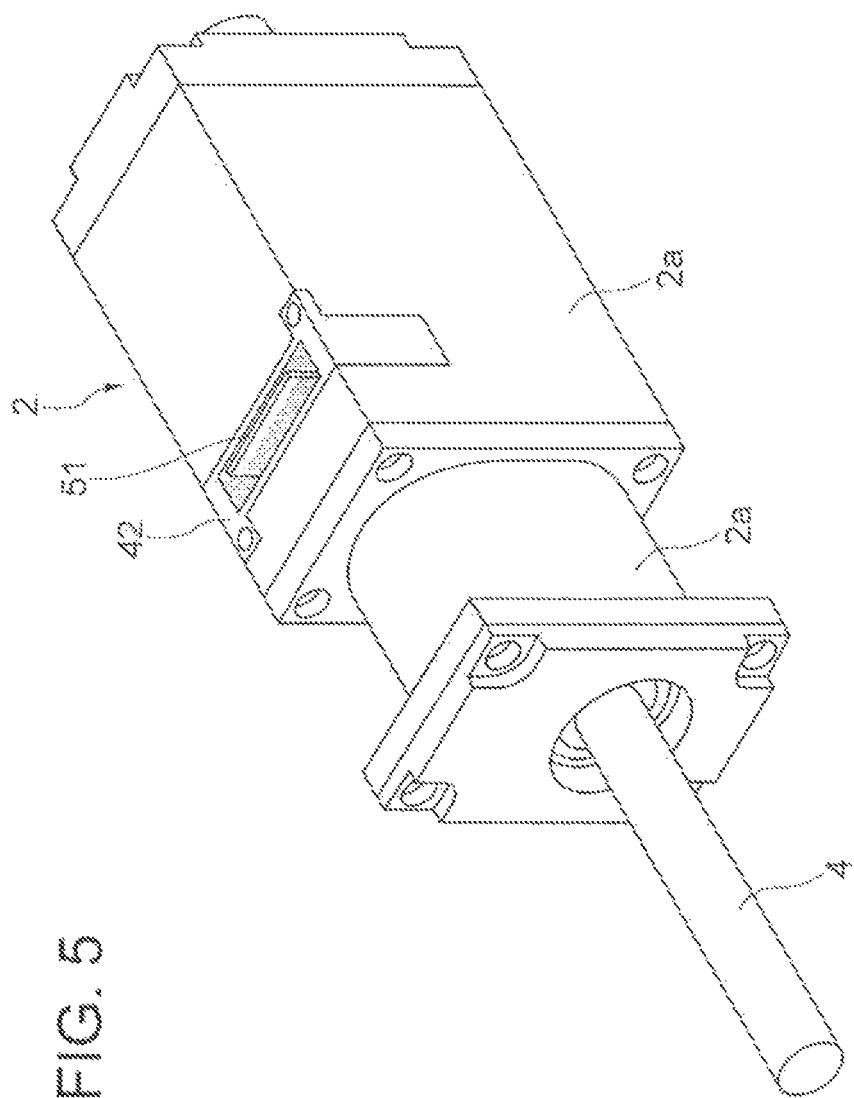
FIG. 5 is a perspective view of a rotary motor.

FIG. 5 is a perspective view of the rotary motor 2. A spline shaft 4 is accommodated rotatable in a housing 2a of the rotary motor 2. An end of the spline shaft 4 is connected to an end of the rod 5 with the axis lines in good agreement with each other. The spline axis 4 is driven in the axial direction by the rod 5 and rotated by the rotary motor 2.

Figure 6:
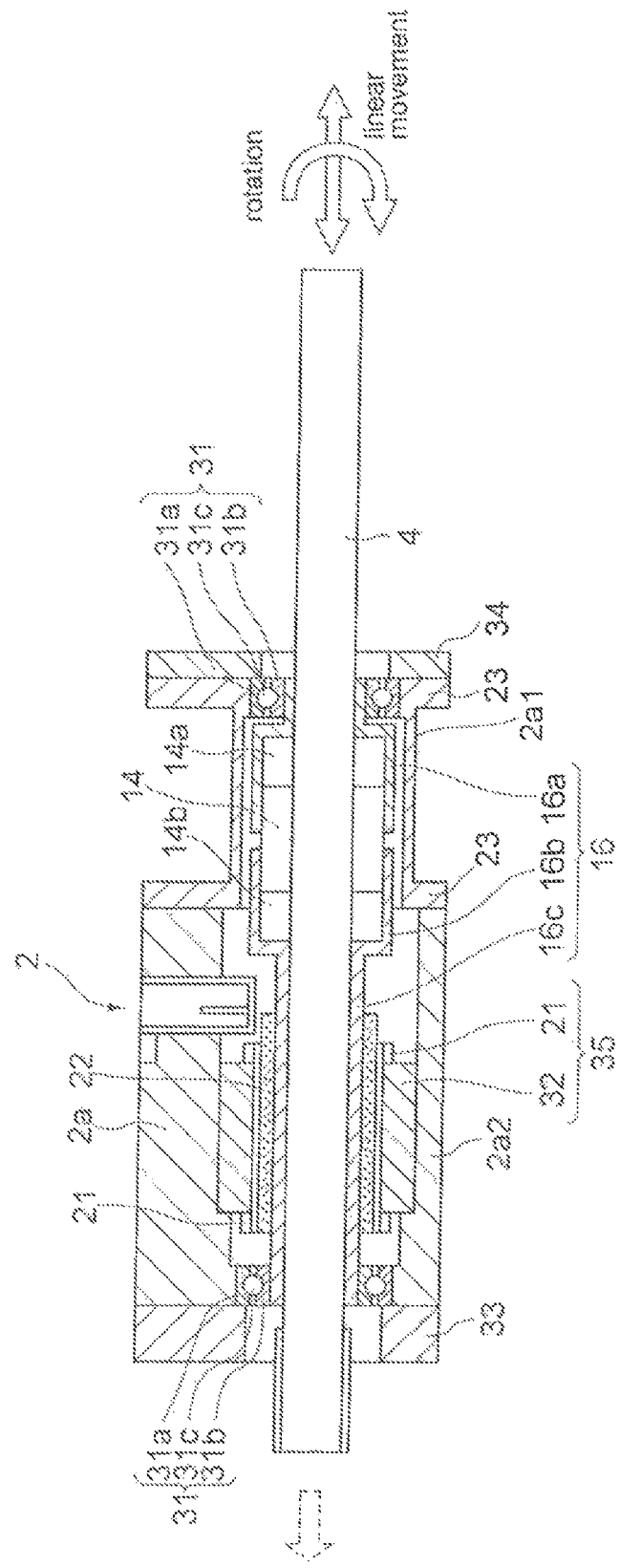
FIG. 6 is a cross sectional view of the rotary motor
Figure 7:
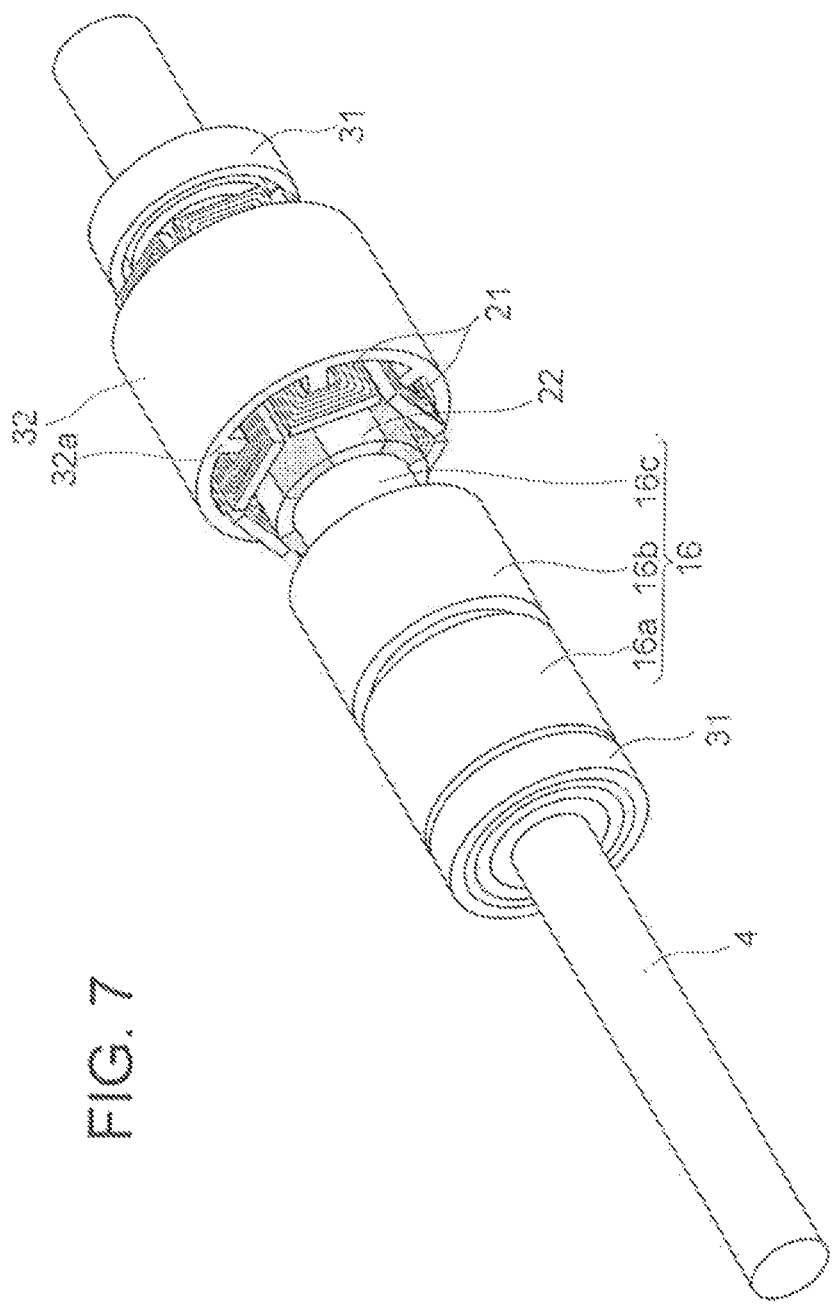
FIG. 7 is a perspective view of the rotary motor from which a housing is removed.

FIG. 6 is a cross sectional view of the rotary motor 2 and FIG. 7 is a perspective view of the rotary motor 2 taken out of the housing 2a. The housing 2a of the rotary motor 2 is connected to the housing 1a of the linear motor 1. As illustrated in FIG. 6, the spline shaft 4 is accommodated rotatable and linearly movable in the housing 2a. The rod 5 of the linear motor 1 is connected to one end 4a (left side in FIG. 6) of the spline shaft 4 and the movable body is mounted on the other end 4b (right side in FIG. 6) of the spline shaft 4. The spline shaft 4 may be connected to the rod 5 with use of joint means such as a screw or may be formed integral with the rod 5. In the outer peripheral surface of the spline shaft 4, a ball rolling groove is formed extending in the axial direction and a spline nut 14 is mounted on the spline shaft 4 for guiding linear movement of the spline shaft 4 (see FIG. 8). The spline nut is held in the tubular rotor 16 and rotates together with the rotor 16. In the housing 2a, the stator 35 is mounted in which a space for accommodating the stator 16 is formed. Between both ends of the rotor 16 in the axial direction and the housing 2a, a pair of bearings 31 is formed for guiding rotation of the rotor 16 on the axial line.

The rotor 16 has a main part 16c rotated by the stator 35 of the rotary motor 2, a spline-nut one-end holding part 16b which is connected to the main part and in which an end of the spline nut 14 in the axial direction is held and a spline-nut opposite-end holding part 16a in which an opposite end of the spline nut 14 in the axial direction to the side of the movable body is held. In this embodiment, the main part 16c is formed integral with the spline-nut one-end holding part 16b. The spline-nut opposite-end holding part 16a is configured to prevent the spline nut 14 from getting out of the spline-nut one-end holding part 16. Between the spline-nut opposite-end holding part 15a and the spline-nut one-end holding part 16b, a space is formed in the axial direction. In the outer peripheral surface of the main part 16c of the rotor 16, the plural permanent magnets 22 are attached in such a manner the N pole and the S pole are formed alternately in the circumferential direction.

The stator 35 of the rotary motor 2 mounted on the housing 2a has three-phase coils 21 facing the permanent magnets 22 and a tubular yoke 21. When the three-phase alternate current flows in the three-phase coils 21, the rotor 16 rotates. When the rotor 16 rotates, the spline nut 14 rotates together with the rotor 16. When the spline nut 14 rotates, the spline shaft 4 mounted on the spline nut 14 rotates.

The housing 2a of the rotary motor 2 has a nut housing 2a1 for accommodating the spline nut 14 and a motor housing 2a2 for accommodating the rotary motor 2. The nut housing 2a1 and the motor housing 2a2 are connected to each other in the axial direction. The nut housing 2a1 is formed into a cylinder shape and has flanges 23 at both ends in the axial direction. The spline nut 14 is held in a center small-diameter part of the nut housing 2a1. On the other hand, the motor housing 2a2 is formed into a hollow tube shape. The stator 35 of the rotary motor 2 is fixed to the inside of the motor housing 2a2.

Figure 8:
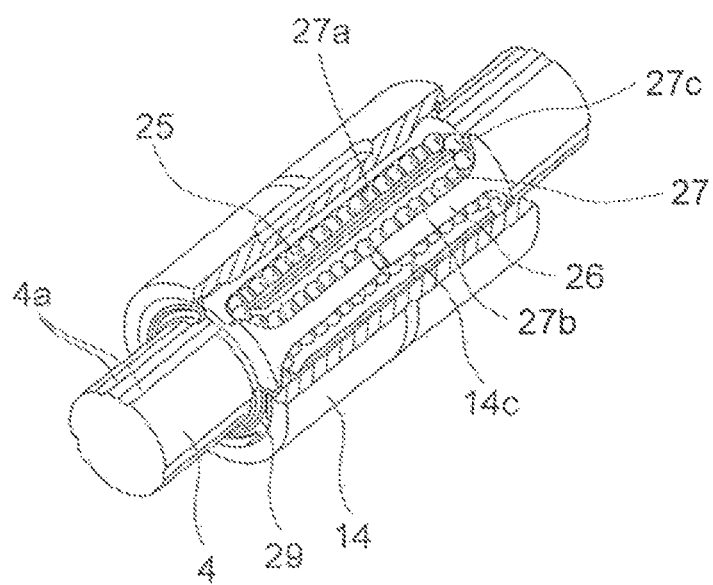
FIG. 8 is a perspective view illustrating a spline nut (including a partial cross sectional view)

FIG. 8 illustrates the spline nut 14 fit on the spline shaft 4. In the outer peripheral surface of the spline shaft 4, a plurality of ball rolling grooves 4a is formed as rolling-element rolling parts extending in the longitudinal direction. In an inner peripheral surface of the spline nut 14, a plurality of loaded ball rolling grooves 14c is formed facing the ball rolling grooves 4a of the spline shaft 4. The spline shaft 4 is a solid-core or hollow round bar. The cross sectional shape of each ball rolling groove 4a in the outer peripheral surface of the spline shaft 4 is a circular arc groove shape of which the curvature is slightly larger than that of the ball 25. The spline shaft 4 is preferably made of a material that is suitable for quench hardening, such as bearing steel or carbon tool steels.

When the ball rolling grooves 4a are formed in the outer peripheral surface of the spline shaft 4, for example, if a moment load on the axis line is applied or a load in the direction orthogonal to the axis line of the spline shaft 4 is applied to the tool at the tip end of the spline shaft 4, these loads can be borne. Besides, a torque applied to the spline nut 14 can be transmitted to the spline shaft 4. Further, it becomes possible to increase the accuracy of guiding of the spline shaft 4 and to position the movable body precisely.

Balls 25 placed between the spline shaft 4 and the spline nut 14 are of steel like rolling elements generally used in bearings. The spline nut 14 is formed into a hollow tube. In the inner peripheral surface of the spline nut 14, load ball rolling grooves 14c are formed extending into the axial direction. The spline nut 14 is preferably of a material suitable for quench hardening such as bearing steel or carbon tool steels. In the spline nut 14, a holder 26 is mounted therein. In the holder 26, plural ball circulation passages 27 are formed as rolling-element circulation passages of which the number is equal to the number of the load ball rolling grooves 14c of the spline nut 14. Each ball circulation passage 27 is a circular passage composed of a load ball rolling passage 27a along the load ball rolling groove 14c of the spline nut 14, a ball return passage 27b extending in parallel with the load all rolling passage 27a and an arc-shaped direction change passage 27c that connects an end of the load ball rolling passage 27a to a corresponding end of the ball return passage 27b. The balls 25 roll in contact with the ball rolling groove 4a of the spline shaft 4 and the load ball rolling groove 14c of the spline nut 14 and circulates the ball circulation passage 27. The holder 26 holds a line of balls arranged and accommodated in the ball circulation passage 27 and prevents the balls 25 from falling down when the spline nut 14 is removed from the spline shaft 4. This holder 26 is fixed at a predetermined position of the spline nut 14 with use of a stop ring 29.

Figure 9:
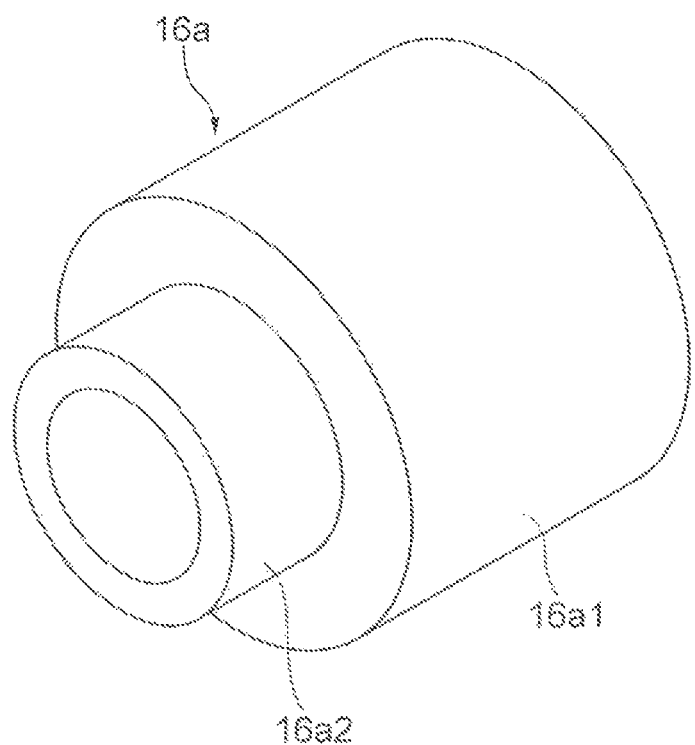
FIG. 9 is a perspective view of a first tubular member.

FIG. 9 is a perspective view of the spline-nut opposite end holding part 16a. The spline-nut opposite-end holding part 16a has a large-diameter part 16a1 and a small-diameter part 16a2 of different diameters. Inside the large-diameter part 16a1 of the spline-nut opposite-end holding part 16a, the opposite end 14a of the spline nut in the axial direction is accommodated. The spline-nut opposite-end holding part 16a and the spline nut 14 are formed into one piece by screwing or bonding. The bearing 31 (see FIG. 7) is fit outside the small-diameter part 16a2 of the spline-nut opposite-end holding part 16a. As illustrated in FIG. 6, the bearing 31 has an outer ring 31a, an inner ring 31b and balls 31c arranged rollably between the outer ring 31a and the inner ring 31b. This bearing 31 supports the spline-nut opposite-end holding part 16a rotatably. The bearing 31 is, for example, a deep-groove radial bearing. The bearing 31 is fit in a flange 23 of the nut housing 2a1, and then, fixed to the nut housing 2a1 by the cover member 34. The bearing 31 may be fixed to the nut housing 2a1 with use of a stop ring instead of the cover member 34.

Figure 10:
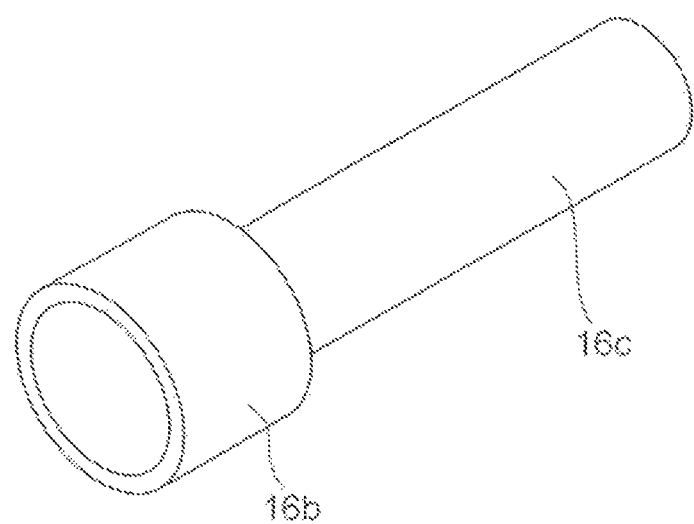
FIG. 10 is a perspective view of a second tubular member.

FIG. 10 is a perspective view of the spline-nut one-end holding part 16b and the main part 16c of the rotor 16. The rotor 16c has a diameter that is smaller than that of the spline-nut one-end holding part 16b. Inside the spline-nut one-end holding part 16b, an end 14b of the spline nut 14 in the axial direction is accommodated (see FIG. 6). The spline-nut one-end holding part 16b and the spline nut 14 are formed into one piece by screwing or bonding. As illustrated in FIG. 7, in the outer peripheral surface of the main part 16c, the plural permanent magnets 22 are attached in the circumferential direction. These permanent magnets 22 face the plural coils 21 arranged in the circumferential direction. The bearing 31 is fit in the opposite end of the main part 16c in the axial direction. The bearing 31 is of the same structure as the bearing 31 that supports the spline-nut opposite-end holding part 16a. As illustrated in FIG. 6, the bearing 31 is fit in one end of the motor housing 2a2, and then, fixed to the motor housing 2a2 with use of the cover member 33. The bearing may be fixed with use of a stop ring instead of the cover member 33.

Figure 11:
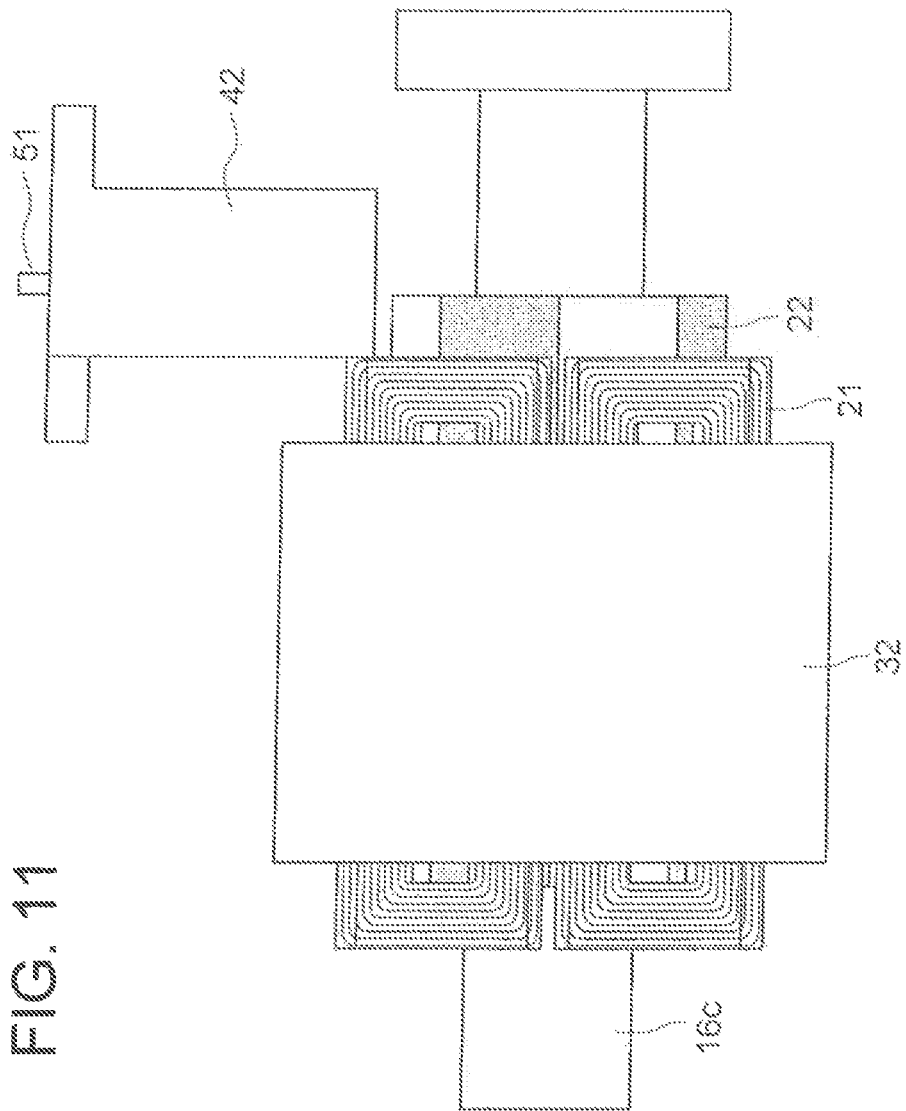
FIG. 11 is a side view of coils and permanent magnets of the rotary motor.

FIG. 11 illustrates the permanent magnets 22 of the rotary motor 2 and the plural coils 21 that faces the plural permanent magnets 22. The rotary motor 2 is a rotary synchronization motor having plural permanent magnets and plural coils facing each other. As the rotary synchronization motor is used, the dimensions in the radial direction can be reduced and the gap can be easily controlled as compared with the case of using a stepping motor that needs comb teeth. Each permanent magnet 22 is an elongating plate. In the permanent magnet 22, magnetic poles are formed in the radial direction. In other words, one of the N pole and the S pole is formed on the outer peripheral surface side and the other is formed on the inner peripheral surface side. In the plural permanent magnets 22, the N pole and S pole are formed alternately in the circumferential direction. The permanent magnets 22 arranged into a cylindrical shape are surrounded by the tubular yoke 32 of magnetic material such as steel. In the yoke 32, a core 32a (see FIG. 7) is formed protruding to the inside in the radial direction. The core 32a elongates in the axial direction of the yoke 32. The coils 21 are wound on the core 32a. The coils 21 are a copper wire wound into ring and formed into a rectangular frame shape. Every three of the coils 21 constitute a unit of three-phase coils 21 of U, V and W phases. In this embodiment, the number of coils 21 is six and two sets of three-phase coils 21 are formed. When the three-phase alternate current passes through the three-phase coils 21, the rotary magnetic field is generated in the circumferential direction of the permanent magnets 22 arranged into a cylindrical shape. The rotor 16 on which the permanent magnets 22 are mounted obtains a torque by the rotary magnetic field and rotates on its axis line.

The permanent magnets 22 arranged in the rotor 16 are driving permanent magnets 22 for generating a torque to rotate the rotor 16. As illustrated in FIG. 11, a magnetic sensor 51 for measuring the rotation angle of the rotor 16 detects a magnetic field generated by an axial end of the driving permanent magnets 22. The characteristics of the magnetic sensor 51 will be described later. The magnetic sensor 51 embodied in the board is accommodated in a box-shaped container 42 and embedded with a filling agent around it. As illustrated in FIG. 5, the container 42 is screwed to the housing 2a. The magnetic sensor 51 has temperature characteristics and its output varies depending on change in temperatures. In order to reduce the influence of heat generated from the coils 21, the container 42 and the filling agent may be of a material of which the heat conductivity is lower than that of the housing 2a. For example, the housing is of an epoxy resin and the container and the filling agent are of polyphenylene sulfide (PPS).

As illustrated in FIG. 1, according to the present embodiment, out of the components of the linear and rotary actuator, the spline nut 14 for torque transmission, the rotary pulse motor 2 and the linear synchronization motor 1 are arranged in this order from the movable body side. As the spline nut 14 is arranged at the position nearest to the movable body, it becomes possible to bear the moment and loads on the movable body and to position the movable body precisely. Further, as the rotation of the spline nut 14 is supported by the bearing 31 (see FIG. 6) near the movable body, it is possible to bear the moment and loads on the spline shaft 4 from the movable body reliably. As the rotary motor 2 is arranged next to the spline nut 14 and the linear motor 1 is arranged next to the rotary motor 2, it is possible to rotate the rotor 16 integral with the spline nut 14 and to move the spline shaft 4 guided by the spline nut 14 in the axial direction.

As the spline nut 14 is arranged inside of the large-diameter part 16a1 of the spline-nut opposite-end holding part 16a and the bearing is arranged outside of the small-diameter part 16a2 of the spline-nut opposite-end holding part 16a, the spline nut 14 and the bearing 31 are prevented from being stacked in the radial direction. Further, as the spline nut 14 is arranged inside of the spline-nut one-end holding part 16b and the rotary motor 2 is arranged outside of the main part 16c, the spline nut 14 and the rotary motor 2 are also prevented from being stacked in the radial direction. Therefore, it becomes possible to downsize the linear and rotary actuator in the radial direction.

Further, as the paired bearings 31 are arranged at both ends of combination of the rotary motor 2 and the spline nut 14 and the rotor 16 is divided into the side of the main part 16c and the spline-nut one-end holding part 16b and the side of the spline-nut opposite-end holding part 16a, it becomes possible to facilitate assembling of the rotary motor 2.

Figure 12:
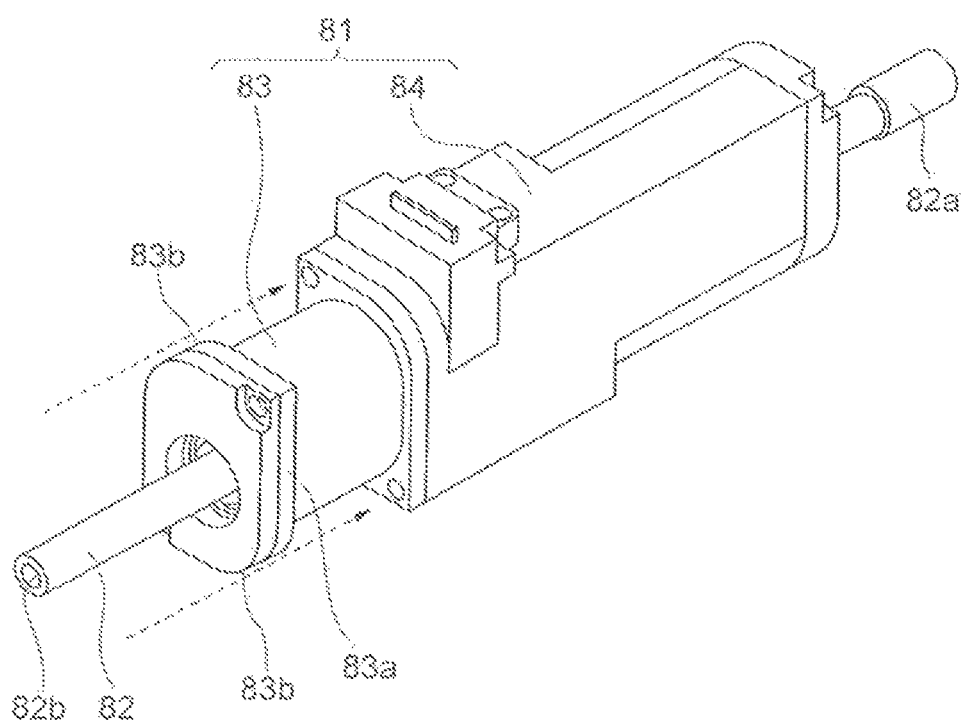
FIG. 12 is a perspective view of a rotary motor of a linear and rotary actuator according a second embodiment of the present invention.

FIG. 12 is a perspective view of a linear and rotary actuator according to a second embodiment of the present invention. Like the rotary motor of the linear and rotary actuator according to the first embodiment, in a housing 81, a spline shaft 82 is held linearly movable and rotatable. Both ends of the spline shaft 82 protrude from the housing 81. An end 82a of the spline shaft 82 is connected to the rod 5 of the linear motor 1 and the opposite end 82b of the spline shaft 82 is connected to the movable body. The housing 81 is divided into a nut housing 83 for accommodating the spline nut and a motor housing 84 for accommodating the stator of the rotary motor. At a corner part of a square-shaped flange 83a of the nut housing 83, an arc-shaped clearance 83b is formed so that a driver or wrench can be inserted straightly along a screw hole (in the direction of the broken line in the figure) when screwing the nut housing 83 to the motor housing 84.

When seeing the rotary motor 80 as a single unit, the spline shaft 82 acts as a rotation axis of the rotary motor 80. The spline shaft 80 can move freely in the axial direction and linear movement of the spline shaft 80 is guided by the spline nut.

Figure 13:
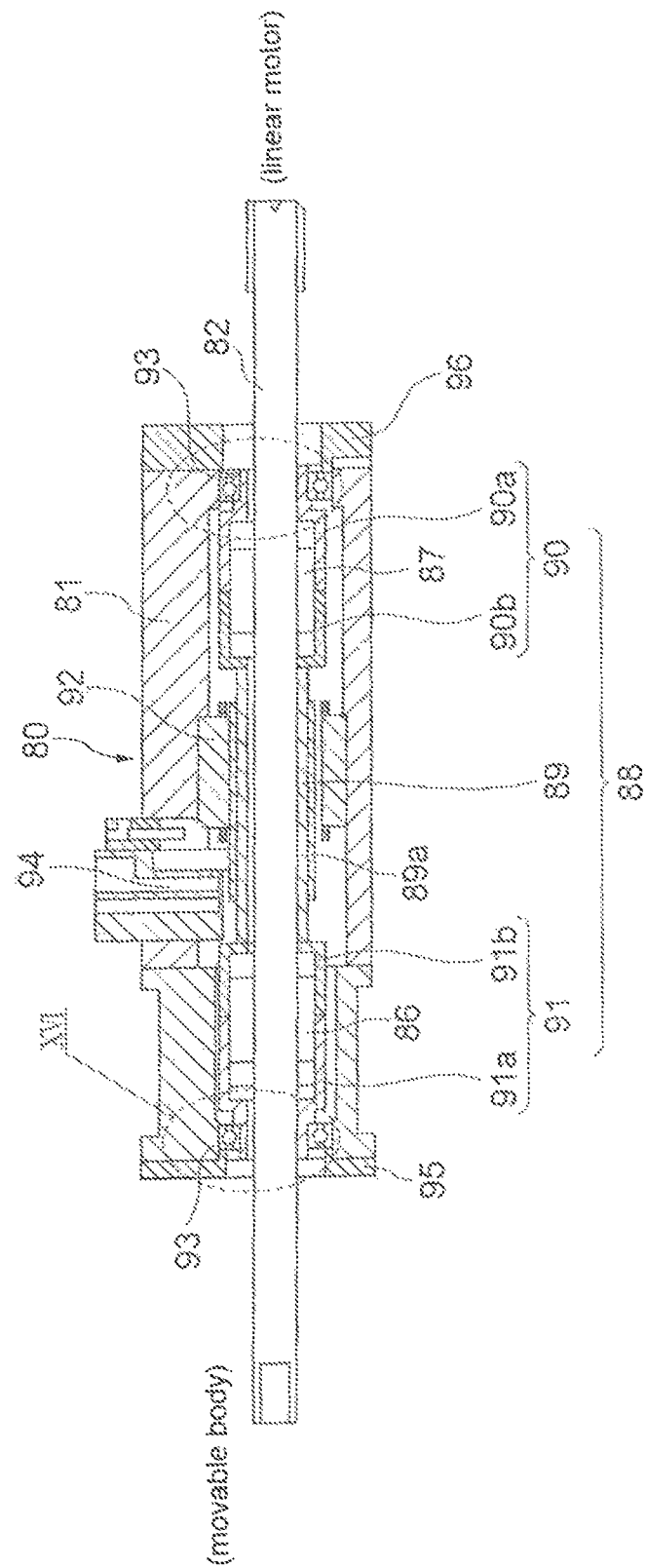
FIG. 13 is a cross sectional view of the rotary motor of FIG. 12.
Figure 14:
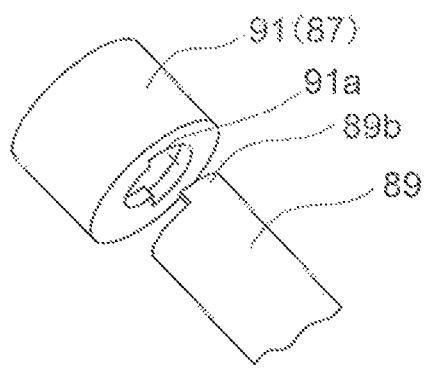
FIG. 14 is an enlarged view of XVI part of FIG. 13.

FIG. 13 is a cross sectional view of the rotary motor 80. In the rotary motor of this embodiment, a second spline nut 87 is provided in addition to the spline nut 86 at the movable body side (left side in the figure). The second spline nut 87 is arranged at the linear motor side of the stator of the rotary motor. The spline nut 86 and the second spline nut 87 are held in the hollow rotor 88 and rotate together with the rotor 88. In the spline nut 86 and the second spline nut 87, a spline shaft 82 is mounted movable linearly. On the outer peripheral surface of the spline shaft 82, ball rolling grooves are formed extending in the axial direction, like the spline shaft of the first embodiment. Rotation of the rotor 88 is transmitted to the spline shaft 82 via the spline nut 86 and the second spline nut 87.

In the housing 81, the stator 92 of the rotary motor is mounted thereon. A pair of bearing 93 is arranged between both ends of the rotor 88 in the axial direction and rotation of the rotor 88 is guided by the paired bearings 92. The rotor 88 has a main part 89 that is rotated by the stator 92 of the rotary motor, a spline nut holding part 91 for holding the spline nut 86 and a second spline nut holing part 90 for holding the second spline nut 87. Like the main part of the first embodiment, a plurality of permanent magnets 89a is attached to an outer peripheral surface of the main part 89 in the circumferential direction. In the housing 81, a magnetic sensor 94 is mounted for detecting the rotation angle of the main part 89. The spline nut holding part 91 and the second spline nut holding part 90 are connected to the respective ends of the main part 89 in the axial direction.

Figure 19:
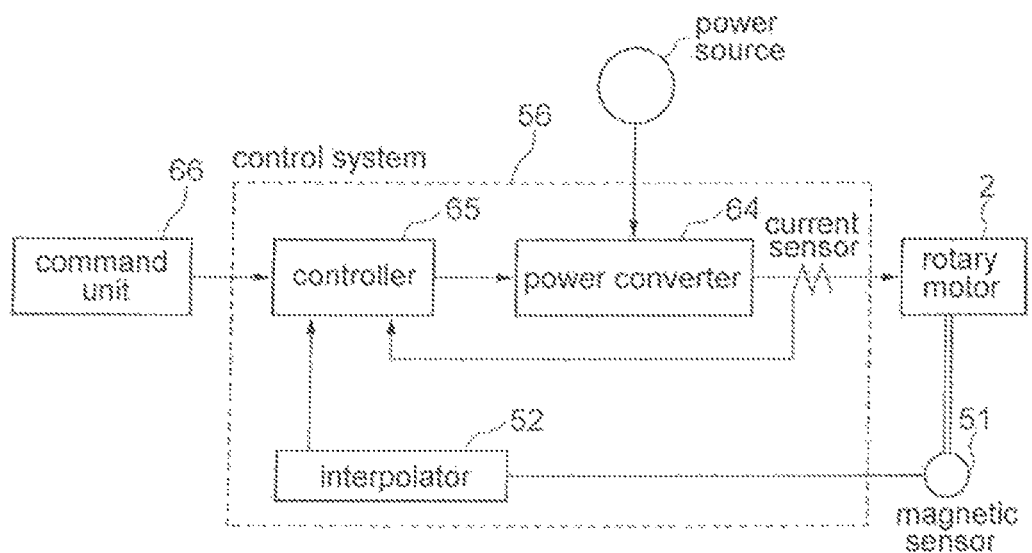
FIG. 19 is a block diagram of a control system of the rotary motor.

FIG. 19 is a detail view of the fitting structure between the main part 89 and the spline nut holding part 91 (and the second spline nut 87). In the spline nut holding part 91, an irregular-shaped hole 91a is formed that is combination of two semi-circles of different radii, and in the main part 89, a semicircular protrusion 89b is formed that is fit in the large-diameter semi-circle of the hole 91a. As the protrusion of the main part 89 is fit in the hole 91a of the spline nut holding part 91 like a gear, rotation of the main part 89 can be transmitted to the spline nut holding part 91. Between the main part 89 and the spline nut holding part 91, a clearance is provided so that the spline nut holding part 91 can moves in the axial direction relative to the main part 89 while rotation is transmitted from the main part 89 to the spline nut holding part 91. Needless to say, the fitting structure of the spline nut holding part 91 and the main part 89 is not limited to the above-mentioned structure of irregular-shaped hole 91a and semicircular protrusion 89b as far as rotation of the main part 89 can be transmitted to the spline nut holding part 91 and there is clearance in the axial direction between the main part 89 and the spline nut holding part 91. The main part 89 and the second spline nut holding part 90 have the same fitting structure.

As illustrated in FIG. 13, the spline nut holding part 91 is connected to the main part 89 and divided into two, that is, a spline-nut one-end holding part 91b for holding one axial end of the spline nut 86 therein and a spline-nut opposite-end holding part 91a for holding an axially opposite end of the spline nut 86 therein. The second spline nut holding part 90 is also connected to the main part 89 and divided into two, that is, a second-spline-nut one-end holding part 90b for holding one axial end of the second spline nut 87 therein and a second-spline-nut opposite-end holding part 90a for holding an axially opposite end of the second spline nut 87 therein. The spline nut holding part 91 and the second spline nut holding part 90 have bag-shaped large-diameter parts, where the spline nut 86 and the second spline nut 87 are accommodated. On the outer peripheral surfaces of small-diameter parts of the spline nut holding part 91 and the second spline nut holding part 90, a pair of bearings 93 is arranged.

In assembling of the rotary motor, first, plural permanent magnets 89a are attached to around the main part 89. Next, the spline nut 86 is covered by two split parts of the spline nut holding part 91 and the second spline nut 86 is covered by the second spline nut holding part 90. Then, the spline nut holding part 91 and the second spline nut holding part 90 are connected to both ends of the main part 89. Next, the paired bearings 93 are fit to the outsides of the spline nut holding part 91 and the second spline nut holding part 90. After the rotor 88 is assembled in this way, the rotor 88 is inserted into the housing 81. Then, the covers 95, 96 are mounted on the both ends of the housing 81 and the assembling process is completed.

In assembling of the rotary motor 80, the bearing 93 is positioned from the housing 81 side and also from the rotor 88 side. If there are dimensional errors in the rotor 88 and housing 81, they center on the bearing 93, a pushing and crushing force acts on the balls of the bearing 93 and the bearing 93 is prevented from performing smooth rotation. According to the present embodiment, the main part 89 of the rotor 88 and the spline nut holding part 91 (and the second spline nut holding part 90) are of the above-mentioned fitting structure, the dimensional errors can be absorbed by the rotor 88 side and the paired bearings 93 can be positioned precisely in accordance with the housing 81. Besides, when heat is generated by the stator 92 of the rotary motor including coils, the housing 81 side has temperatures higher than that of the rotor 88 side. Also as the linear expansion coefficient of the housing 81 of aluminum is greater than that of the rotor 88 of steel, thermal expansion of the housing 81 becomes greater than that of the rotor 88. With the above-mentioned fitting structure, this thermal expansion of the housing 81 can be also absorbed.

Figure 15:
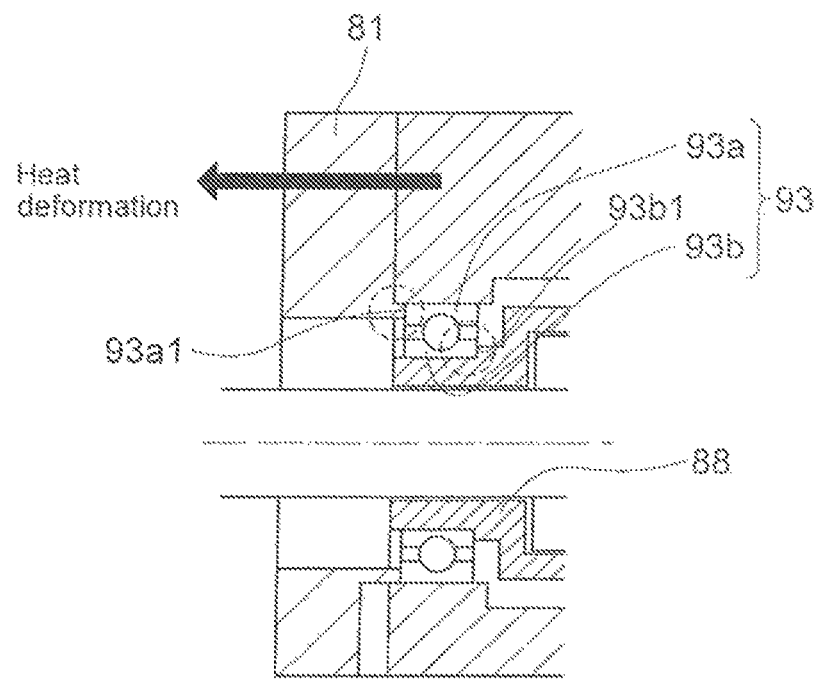
FIG. 15 is a detail view of a bearing fixing part.
Figure 16:
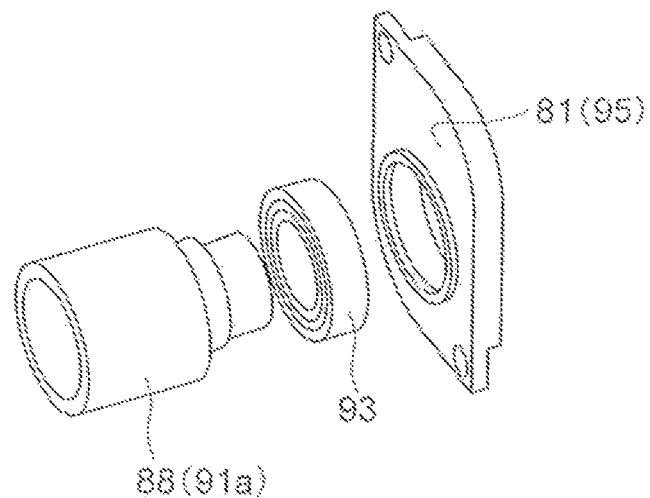
FIG. 16 is a perspective view of a fitting part.

FIGS. 15 and 16 are detail view of the fixing part of the bearing 93. The inside part 93b1 of the inner ring 93b of the paired bearings 93 abuts to the rotor 88 and the outside part 93a1 of the outer ring 93a of the paired bearing 93 abuts to the housing 81 (indicated by the circle of the broken line). Then, the paired bearings 93 are sandwiched between the rotor 88 and the housing 81. With this structure, if the housing expands in the axial direction due to the heat of the stator 92 of the rotary motor, the abutting part of the housing 81 moves in the direction away from the contact part of the rotor 88 and thereby, it becomes possible to prevent the pushing and crushing force from acting on the balls of the bearings 93.

According to the present embodiment, as the two spline nuts 86 and 87 are used at both sides of the stator 92 of the rotary motor, it becomes possible to prevent vibration of the spline shaft 82 and to increase the rigidity of the spline shaft 82, as compared with the case of using one spline nut 86. Therefore, even when the gain of the linear motor or rotary motor is increased to have good response of the servo loop, the vibration of the spline shaft 82 can be prevented and the more responsive servo loop can be achieved.

Figure 17:
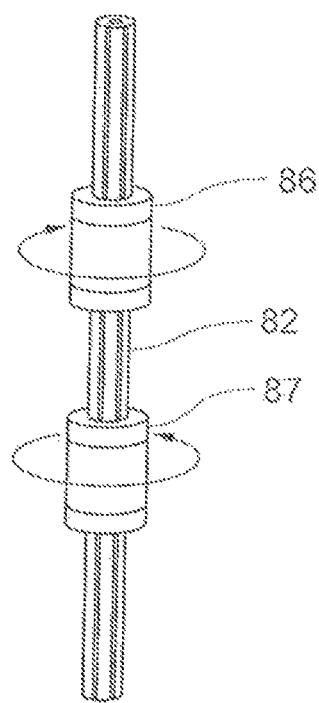
FIG. 17 is a perspective view of two spline nuts that are twisted and mounted on the spline shaft.

FIG. 17 illustrates an example of the spline shaft 82 of higher rigidity. In this example, the spline nut 86 and the second spline nut 87 are fixed to the rotor 88 as twisted in the opposite directions relative to the spline shaft 82. The spline nut 86 shown above in the figure is given a torque in the clockwise direction relative to the spline shaft 82 and the second spline nut 87 shown to the lower side is given a torque in the counterclockwise direction while they are fixed to the rotor 88. Balls arranged in the spline nut 86 and balls arranged in the second spline nut 87 are compressed in the opposite directions to each other, therefore, the balls can be kept preloaded and the rigidity in the circumferential direction of the spline shaft 82 can be improved.

Figure 18:
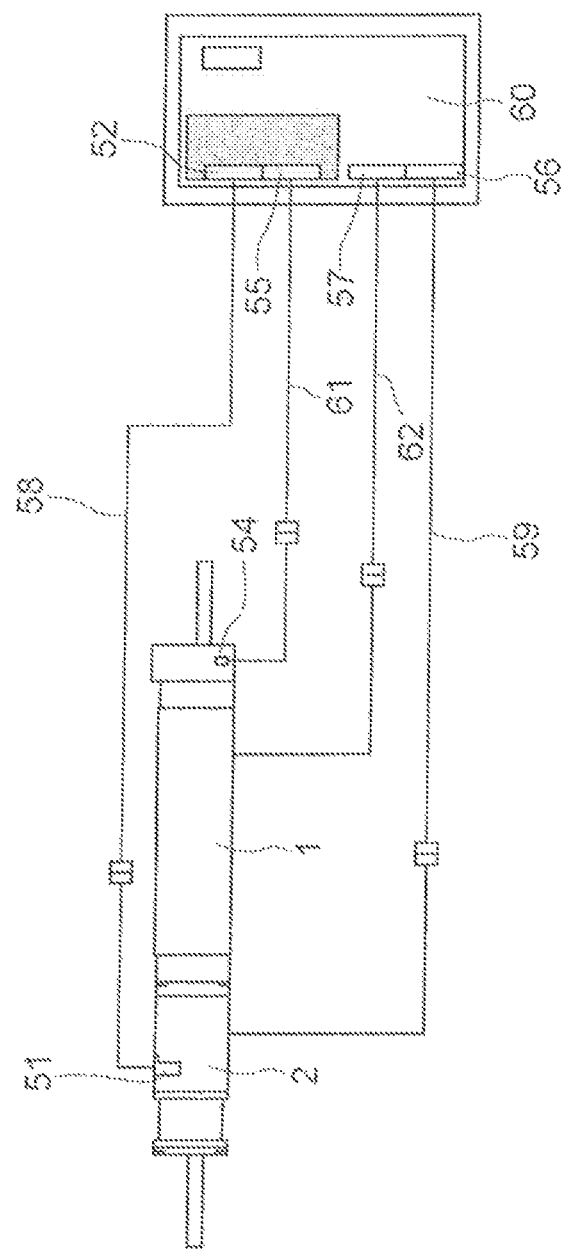
FIG. 18 is a view of system configuration of the linear and rotary actuator according to the first embodiment of the present invention.

FIG. 18 illustrates a linear and rotary actuator system according to one embodiment of the present invention. This linear and rotary actuator system has a rotary motor control system and a linear motor control system. The rotary motor control system has a magnetic sensor 51 for detecting the rotary angle of the rotor 16 of the rotary motor 2, an interpolator 52 as an angle calculating circuit for interpolating a signal output from the magnetic sensor 51 and a rotary motor driver 56 for controlling the rotary motor 2 based on a signal of the rotary angle calculated by the interpolator 52. The rotary motor driver 56 controls the rotary motor 2 in such a manner that the rotation angle of the rotor 16 conforms to a command value. The magnetic sensor 51 and the interpolator 52 are connected by the encoder cable 58 and the coils 21 of the rotary motor 2 and the power converter of the rotary motor driver 56 are connected by a power cable 59. The interpolator 52 and the rotary motor driver 56 are accommodated in the control board 60.

Likewise, the linear motor control system includes a magnetic sensor 54 for detecting the position of the rod 5 of the linear motor 1 in the axial direction, a position calculating circuit 55 for performing interpolation of a signal output from the magnetic sensor 54 and a linear motor driver 57 for controlling the linear motor based on the signal of the position calculated by the position calculating circuit 55. The linear motor driver 57 controls the linear motor 1 in such a manner that the position of the rod 5 conforms to a command value. The magnetic sensor 54 and the position calculating circuit 55 are connected by an encoder cable 61. The coils 12 of the linear motor 1 and the power converter of the linear motor driver 57 are connected by a power cable 62. The position calculating circuit 55 and the linear motor driver 57 are accommodated in a control board 60.

An angle measuring unit has a magnetic sensor 51 for detecting the rotation angle of the rotor 16 of the linear and rotary actuator and an interpolator 52 for performing interpolation of a signal output from the magnetic sensor 51. The magnetic sensor 51 detects the direction of the magnetic field of the rotor 16 and outputs sine wave and cosine wave voltage signals of 90-degree phase shifted from each other. The voltage signals output from the magnetic sensor 51 are input to the interpolator 52. The interpolator 52 calculates angle information of the rotor 16 based on the sine wave and cosine wave voltage signals. The position measuring unit for measuring the position of the linear motor 1 outputs position information of the rod 5 like the angle measuring unit.

FIG. 19 is a block diagram of a control system of the rotary motor 2. The angle information calculated by the interpolator 52 is output to a controller 65 of the rotary motor driver 56. In the rotary motor driver 56, a power converter 64 such as a PWM (Pulse Width Modulation) inverter for supplying power in the form suitable to control the linear motor 1 and a controller 65 for controlling the power converter 64 are embedded. The controller 65 controls the power converter 64 in accordance with instructions from a command unit 66 such as a high-level computer and a signal from the interpolator 52. Specifically, the controller 65 controls the power converter 64 in such a manner that the rotation angle of the rotor 16 conforms to a command value. The linear motor driver 57 is structured like the rotary motor driver.

As the spline shaft 4 and the rotor 16 of the rotary motor 2 are connected by the spline nut 14, the rotation angle of the spline shaft 4 is equal to the rotation angle of the rotor 16. Through control of the rotation angle of the rotor 16 of the rotary motor 2 that does not move in the axial direction, the rotation angle of the spline shaft 4 that moves in the axial direction is controlled so that the rotation angle of the spline shaft 4 can be facilitated. Besides, generally, as the permanent magnets 22 for driving to generate thrust are diverted as the magnetic scale, the magnetic sensor 51 can be realized as an inexpensive and small-sized one.

Figure 20:
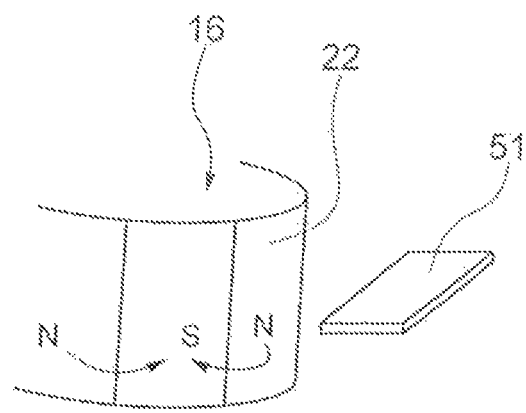
FIG. 20 is a view illustrating the positional relation between a magnetic sensor and a rotor.

As illustrated in FIG. 20, the magnetic sensor 51 is arranged a predetermined space away from the permanent magnets 22 of the rotary motor and detects change in direction of the magnetic field (direction of the magnetic vector) of the permanent magnets 22 generated by the rotation of the permanent magnets 22. As it detects change in direction of the magnetic field, the board on which the magnetic sensor 51 is embodied is located in a plane orthogonal to the rotation center of the rotor 16.

Figure 21:
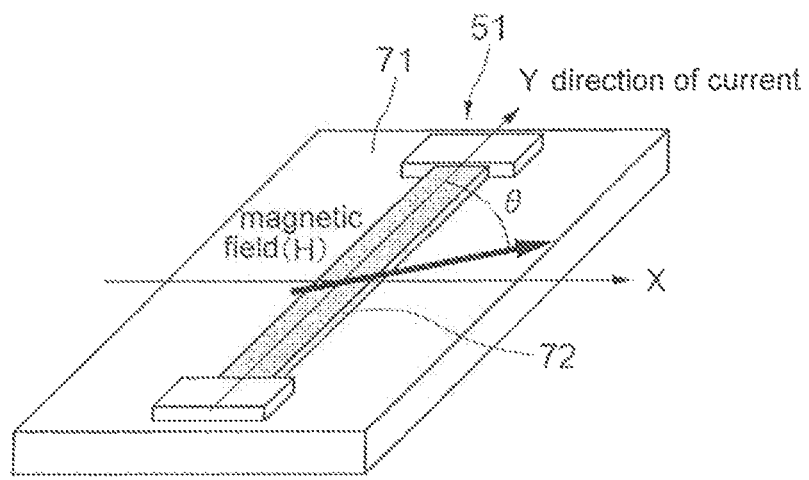
FIG. 21 is a perspective view of the principle of the magnetic sensor.

As illustrated in FIG. 21, the magnetic sensor 51 has a Si or glass substrate 71 and a magnetic resistive element 72 of ferromagnetic thin-film metal alloy containing ferromagnetic metal such as Ni or Fe as a main ingredient, the magnetic resistive element 72 being formed on the Si or glass substrate 71. This magnetic sensor 51 is called AMR (Anisotropic-Magnetro-Resistance) sensor as the resistance value varies in a specific magnetic-field direction.

Figure 22:
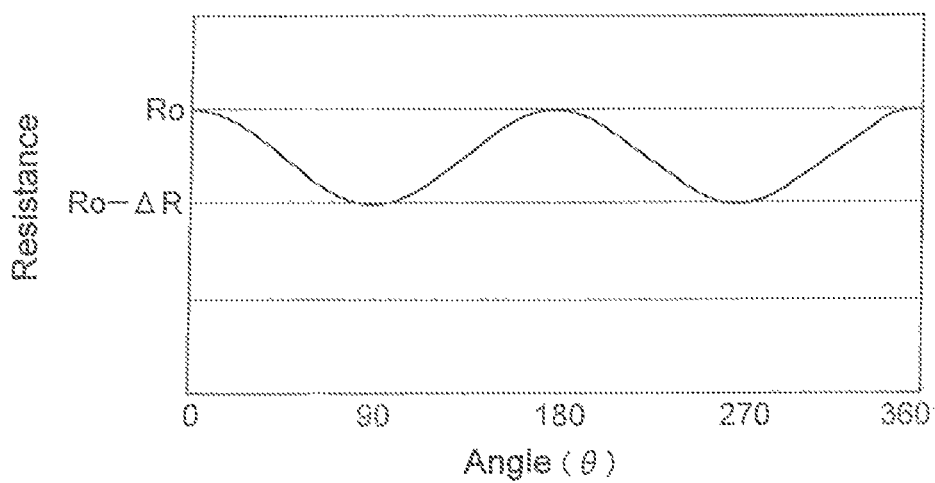
FIG. 22 is a graph showing the relation of resistance of the magnetic sensor and the angle θ of the direction of the magnetic field.

It is assumed that current passes through the magnetic resistive element 71, the magnetic field strength is applied such that the resistance change becomes saturated and the magnetic-field (H) direction is given an angle change $\theta$ relative to the current direction Y. As illustrated in FIG. 22, the resistance change (ΔR) is maximized when the current direction crosses the magnetic-field direction at the right angles (θ=90, 270 degrees) and is minimized when the current direction and the magnetic-field direction are parallel to each other (θ=0, 180 degrees). The resistance value R varies as expressed by the following expression (1) in accordance with the angle components of current direction and the magnetic-field direction.

(Expression 1)

$$R=R_0-\Delta R \sin^2\theta \quad (1)$$

$R_0$: Resistance of ferromagnetic thin-film metal in the absence of the magnetic field
ΔR: Resistance change
θ: Angle indicating the magnetic-field direction ΔR is constant in a range of the saturation sensitivity or more and the resistance R is not affected by the magnetic field strength.

Figure 23:
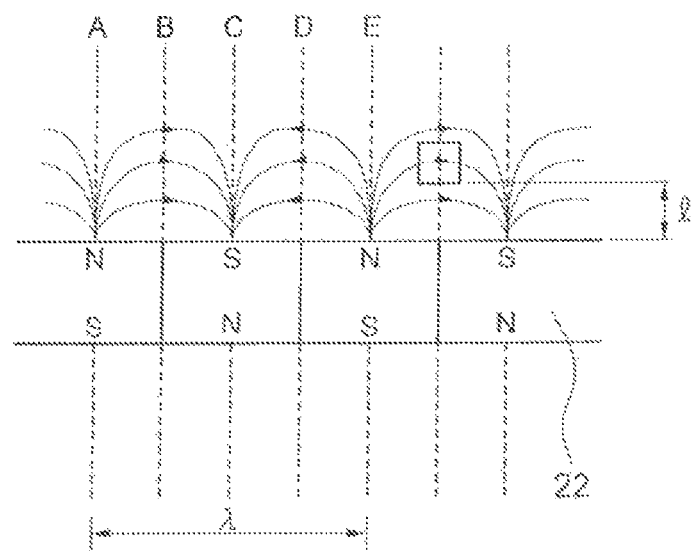
FIG. 23 is a view illustrating the positional relation between the magnetic sensor and the magnetic field generated in the rotor.
Figure 24:
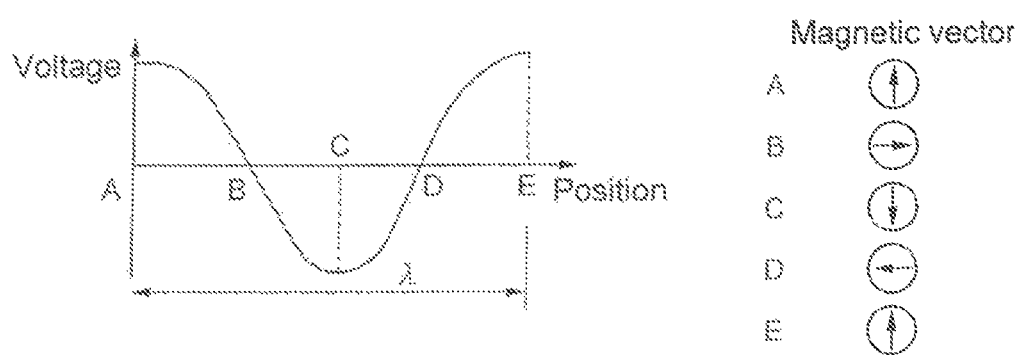
FIG. 24 is a graph illustrating the relation of output voltage and direction of the magnetic vector detected by the magnetic sensor.

Next description is made about change in magnetic-field direction when the rotor 16 moves linearly and outputs of the magnetic sensor 51. As illustrated in FIG. 23, the magnetic sensor 51 is positioned with such a gap l that the magnetic field strength of saturation sensitivity or more is applied and in such a manner that the change in magnetic-field direction contributes to a sensor plane. As illustrated in FIG. 23, the permanent magnets 22 which is arranged in a circumference are developed in the horizontal direction. As illustrated in FIG. 24, when the rotor 16 moves linearly by a distance A, the magnetic-field direction shows one turn in the sensor plane. At this time, the voltage signal becomes sine wave of one cycle. In order to know the direction of movement, as illustrated in FIG. 25, two elements of full-bridge structure may be formed on one board as 45-degree inclined from each other. Outputs V out A and V out B obtained by the two full-bridge circuits become cosine wave and sine wave of 90-degree phase shifted from each other which is illustrated in FIG. 26.

Figure 27:
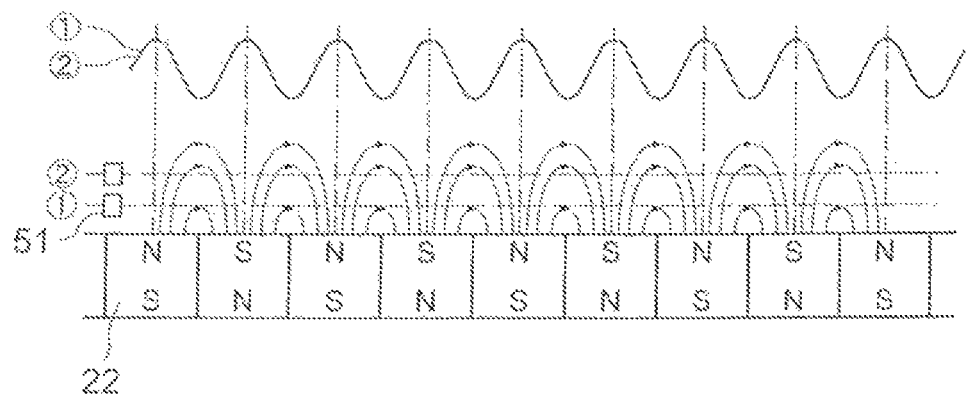
FIG. 27 is a conceptual view illustrating output signals from the magnetic sensor and the positional relation between the magnetic sensor and the rotor.
Figure 28:
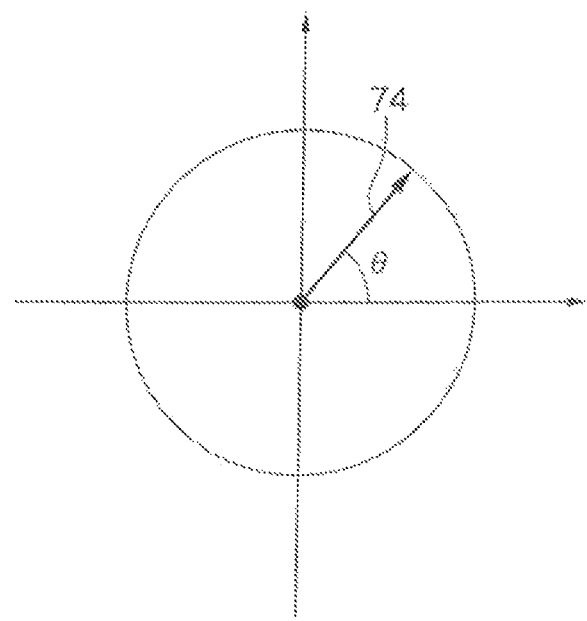
FIG. 28 is a view illustrating a Lissajous curve drawn by the sine wave and cosine wave.

According to the present embodiment, the magnetic sensor 51 detects change in direction of the magnetic field of the rotor 16. With this structure, even if the mounting position of the magnetic sensor 51 is shifted from (1) to (2), as illustrated in FIG. 27, there is less change in the sine wave and cosine wave output from the magnetic sensor 51. As illustrated in FIG. 28, as to the Lissajous curve drawn by the sine wave and cosine wave, there is little change in size of the circle. Therefore, the direction θ of the magnetic vector 74 can be detected accurately. As the accurate position of the rotor 16 can be detected even without high-precise control of the gap l between the rotor 16 and the magnetic sensor 51, the mounting of the magnetic sensor 51 can be easily adjusted.

Figure 29:
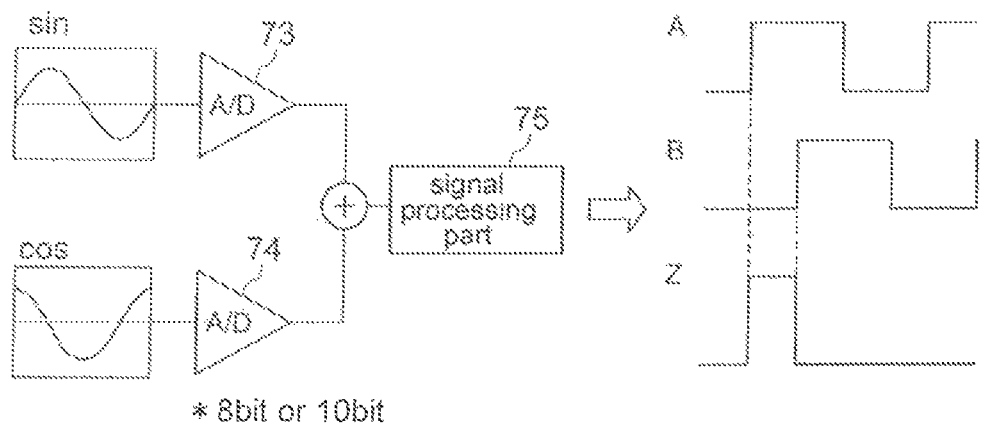
FIG. 29 is a structural view of a position detecting circuit.

FIG. 29 is a structural view of an interpolator 52. A sine wave signal and a cosine wave signal output from the magnetic sensor 51 are inserted into the interpolator 52. The interpolator 52 outputs performs digital interpolation on the sine wave signal and the cosine wave signal of which the phases are 90-degree shifted from each other and outputs high-resolution phase angle data. The pitch between the magnetic poles of the rotor 16 is, for example, several-ten orders of millimeters and is much greater than several-hundred orders of micrometers of the magnetic encoder. When the rotor 16 is diverted as a magnetic scale, the sine wave signal and cosine wave signal output from the magnetic sensor 51 need to be segmentalized and increased in resolution. Changes in sine wave signal and cosine wave signal output from the magnetic sensor 51 exert much influence on a resolution-increased position calculating circuit. Therefore, the changes in sine wave signal and cosine wave signal output from the magnetic sensor 51 are preferably small.

The sine wave signal and cosine wave signal of 90-degree phase shifted from each other are input to A/D converters 73 and 74. The A/D converters 73 and 74 perform sampling of the sine wave signal and cosine wave signal into digital data DA, DB at predetermined intervals.

Figure 30:
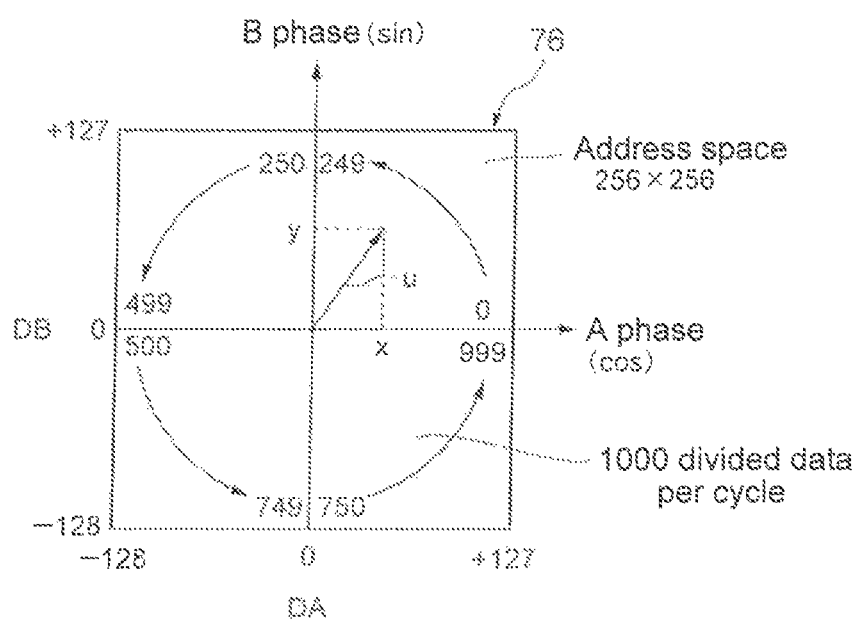
FIG. 30 is a memory configuration view of a lookup table memory.

As illustrated in FIG. 30, lookup table data that is created based on the following expression using arctan (TAN$^{-1}$) is stored in advance in a lookup table memory 76.

(Expression 2)

$$U=\text{TAN}^{-1}(DB/DA) \quad (2)$$

FIG. 30 illustrates a memory configuration of the lookup table memory storing the phase angle data divided by 1000 per one cycle in an address space of 8-bit×8-bit.

A signal processing part 75 as phase angle data calculating means searches the lookup table data for the digital data DA, DB as x, y addresses to calculate phase angle data u corresponding to the x, y addresses. This enables division and interpolation within one wavelength (0 to 2π zone). Here, instead of use of the lookup table memory, calculation of U=TAN$^{-1}$(DB/DA) is performed to obtain the phase angle data u so that the division and interpolation within one wavelength (0 to 2π zone) may be performed.

Next, the signal processing part 75 generates A-phase and B-phase encoder pulse signals from the phase angle data and generates a Z-phase pulse signal per cycle. The A-phase pulse signal, B-phase pulse signal and Z-phase pulse signal output from the signal processing part 75 are output to the rotary motor driver 56 of the rotary motor 2.

The present invention is not limited to the above-described embodiments and may be embodied in various forms without departing from the scope of the present invention. For example, application of the linear and rotary actuator of the above-mentioned embodiments is not limited to the chip mounter and may be used as each linear and rotary actuator of various robots. Besides, in the invention of the linear and rotary actuator system, a linear stepping motor may be used instead of the linear motor synchronization motor.

The present specification is based on Japanese Patent Applications No. 2008-255073 filed on Sep. 30, 2008, the entire contents of which are expressly incorporated by reference herein.

REFERENCE NUMERALS

1 . . . linear motor, 2 . . . rotary motor, 2a, 81 . . . housing, 3a . . . one end of shaft member, 3 . . . shaftmember, 4, 82 . . . spline shaft, 4a . . . ball rolling groove (rolling-element rolling part), 5 . . . rod, 6 . . . permanent magnets, 10 . . . bush (sliding bearing), 12 . . . coil (stator of linear motor), 14, 86 . . . spline nut, 14a . . . opposite end spline nut, 14b . . . one end of spline nut, 16, 88 . . . rotor, 16a . . . spline-nut opposite-end holding part, 16b . . . spline-nut one-end holding part, 16a1 . . . large-diameter part, 16a2 . . . small-diameter part, 16b1 . . . large-diameter part, 16b2 . . . small-diameter part, 16c, 89 . . . main part, 21 . . . coil, 22, 89a . . . permanent magnet, 25 . . . ball (rolling element), 27 . . . ball circulation passage (rolling-element circulation passage), 31, 93 . . . bearing, 32 . . . yoke, 35, 92 . . . stator of rotary motor, 51 . . . magnetic sensor (angle measuring unit), 52 . . . interpolator (angle measuring unit, angle calculating circuit), 56 . . . rotary motor driver, 87 . . . second spline nut, 90 . . . second spline nut holding part, 90a . . . second spline-nut opposite-end holding part, 90b . . . second spline-nut one-end holding part, 91 . . . spline nut holding part, 91a . . . spline-nut opposite-end holding part, 91b . . . spline-nut one-end holding part

The invention claimed is:

1. A linear and rotary actuator system, comprising:
a shaft member configured to move linearly in an axial direction and rotate around an axis line;
a hollow rotor surrounding the shaft member;
a stator of a rotary motor in which a space for holding the rotor is formed and which rotates the rotor around the axis line;
a linear bearing that rotates together with the rotor to transmit rotation of the rotor of the rotary motor to the shaft member and accepts linear movement of the shaft member;
an angle measuring unit configured to measure a rotation angle of the rotor; and
a rotary motor driver configured to control the rotary motor in such a manner that the rotation angle of the rotor of the rotary motor measured by the angle measuring unit conforms to a command value, wherein
the shaft member comprises a spline shaft having a rolling-element rolling part extending in an axial direction,
the linear bearing comprises a spline nut having a rolling-element circulation passage including a loaded rolling-element rolling part facing the rolling-element rolling part of the spline shaft and a plurality of rolling elements arranged in the rolling-element circulation passage,
each one of the two spline nuts is provided at both sides of a stator of the rotary motor, and
the rotation angle of the shaft member is controlled by controlling the rotation angle of the rotor of the rotary motor.

2. The linear and rotary actuator system of claim 1, further comprising:
a housing on which the stator of the rotary motor is mounted; and
a pair of bearings each provided between an end of the rotor in the axial direction and the housing and configured to guide rotation of the rotor around the axis line,
wherein the rotor comprises a main part that is rotated by the stator of the rotary motor, a spline nut holding part that is connected to an end of the main part and is configured to hold the spline nut, and
rotation of the main part is transmitted to the spline nut holding part, the main part fits in the spline nut holding part in such a manner that there is such clearance that the spline nut holding part can move in the axial direction relative to the main part.

3. The linear and rotary actuator system of claim 2, wherein the rotor abuts to insides of inner rings of the bearings in the axial direction, the housing abuts to outsides of outer rings of the bearings in the axial direction, and each of the bearings is sandwiched between the rotor and the housing in the axial direction.

4. The linear and rotary actuator system of claim 1, further comprising:
a housing on which the stator of the rotary motor is mounted; and
a pair of bearings each provided between both ends of the rotor in the axial direction and the housing and configured to guide rotation of the rotor around the axis line,
wherein the rotor has a main part that is rotated by the stator of the rotary motor, a spline-nut one-end holding part that is configured to hold one end of the spline nut in the axial direction, and a spline-nut opposite-end holding part that is configured to hold an opposite end of spline nut in the axial direction,
the spline-nut opposite end holding part has a large-diameter part and a small-diameter part of different diameters,
the opposite end of the spline nut is held in the large-diameter part of the spline-nut opposite-end holding part, and
one of the bearings is arranged between an outer peripheral surface of the small-diameter part of the spline-nut opposite-end holding part and the housing.

5. The linear and rotary actuator system of claim 1, wherein the two spline nuts are held in the rotor twisted in opposite directions to each other relative to the spline shaft.

6. The linear and rotary actuator system of claim 1, wherein the rotary motor comprises a rotation synchronization motor having the rotor of the rotary motor with a plurality of permanent magnets arranged in such a manner that N poles and S poles are formed in a circumferential direction and a plurality of coils as the stator of the rotary motor facing the permanent magnets, and
wherein the angle measuring unit detects a magnetic field of the permanent magnets for driving to generate a torque on the rotor of the rotary motor.

7. The linear and rotary actuator system of claim 1, wherein the angle measuring unit comprises
a magnetic sensor that has a magnetic resistive element of which a resistance varies in a magnetic-field direction and outputs a sine wave signal and a cosine wave signal of 90-degree phase shifted from each other in accordance with change in the magnetic-field direction of the permanent magnets generated by rotation of the rotor of the rotary motor, and
an angle calculating circuit for calculating the rotation angle of the rotor relative to the stator of the rotary motor based on the sine wave signal and the cosine wave signal.

* * * * *